(12) United States Patent
Arai et al.

(10) Patent No.: US 11,353,607 B2
(45) Date of Patent: Jun. 7, 2022

(54) ULTRASONIC SENSOR, ELECTRONIC APPARATUS, AND METHOD OF DRIVING ULTRASONIC SENSOR

(71) Applicant: Seiko Epson Corporation, Tokyo (JP)

(72) Inventors: Yoshio Arai, Shiojiri (JP); Ryoki Watanabe, Matsumoto (JP)

(73) Assignee: Seiko Epson Corporation

( * ) Notice: Subject to any disclaimer, the term of this patent is extended or adjusted under 35 U.S.C. 154(b) by 323 days.

(21) Appl. No.: 16/285,745

(22) Filed: Feb. 26, 2019

(65) Prior Publication Data
US 2019/0265374 A1 Aug. 29, 2019

(30) Foreign Application Priority Data
Feb. 27, 2018 (JP) .............................. JP2018-033608

(51) Int. Cl.
*G01V 1/28* (2006.01)
*B65H 7/12* (2006.01)
*G01V 1/04* (2006.01)

(52) U.S. Cl.
CPC .............. *G01V 1/288* (2013.01); *B65H 7/125* (2013.01); *G01V 1/04* (2013.01); *G01V 1/282* (2013.01)

(58) Field of Classification Search
CPC .......... G01V 1/288; G01V 1/04; G01V 1/282; B65H 7/125; B65H 2553/26; B65H 2553/30; B65H 2402/46; B65H 2553/822; B06B 1/0207; B06B 1/0688
See application file for complete search history.

(56) References Cited

U.S. PATENT DOCUMENTS

| | | | | |
|---|---|---|---|---|
| 4,446,735 | A * | 5/1984 | Weilacher | G01B 17/02 73/159 |
| 5,653,236 | A * | 8/1997 | Miller | G10K 11/346 600/447 |
| 5,691,474 | A * | 11/1997 | Gerz | G01B 17/02 73/159 |
| 6,314,054 | B1 * | 11/2001 | Priebsch | B65C 9/42 271/263 |

(Continued)

FOREIGN PATENT DOCUMENTS

| | | |
|---|---|---|
| JP | H05-056851 U | 7/1993 |
| JP | 2006-298598 A | 11/2006 |

(Continued)

*Primary Examiner* — Isam A Alsomiri
*Assistant Examiner* — Vikas Atmakuri
(74) *Attorney, Agent, or Firm* — Harness, Dickey & Pierce, P.L.C.

(57) ABSTRACT

An ultrasonic sensor includes a transmission unit that is disposed on a first axis which is inclined with respect to a normal line of a surface of an object, a reception unit that is provided on a side opposite to the transmission unit of the object, on the first axis, and a transmission control unit that controls drive of the transmission unit. The transmission unit includes a plurality of transmission elements that transmit ultrasonic waves, and the plurality of transmission elements are arranged in a first direction that intersects the first axis in a plane including the normal line and the first axis. The transmission control unit delay-drives the plurality of transmission elements to align a direction of the ultrasonic wave that is transmitted from the transmission unit with the first axis.

13 Claims, 20 Drawing Sheets

(56) References Cited

U.S. PATENT DOCUMENTS

| | | | | |
|---|---|---|---|---|
| 6,407,964 B1* | 6/2002 | Hornung | G01N 29/221 | 367/138 |
| 6,456,419 B1* | 9/2002 | Winker | G02B 27/0087 | 250/227.17 |
| 6,763,721 B2* | 7/2004 | Wunderer | G01B 17/02 | 382/137 |
| 7,912,272 B2* | 3/2011 | Joshi | G07D 7/121 | 382/137 |
| 7,987,717 B2* | 8/2011 | Casagrande | G01N 29/28 | 73/573 |
| 8,045,868 B2* | 10/2011 | Kuramochi | G03G 15/5029 | 399/45 |
| 8,256,294 B2* | 9/2012 | Ishida | G03G 15/65 | 73/596 |
| 8,421,046 B2* | 4/2013 | Leuthold | G01N 21/15 | 250/556 |
| 8,570,622 B2* | 10/2013 | Pellaton | B65H 7/12 | 358/498 |
| 8,813,552 B2* | 8/2014 | Matsumoto | H01M 10/425 | 73/150 R |
| 8,894,580 B2* | 11/2014 | Kisner | G01N 29/00 | 600/443 |
| 9,251,781 B1* | 2/2016 | Ahmed | G10K 11/346 | |
| 9,542,787 B2* | 1/2017 | Blair | G07D 7/08 | |
| 2003/0025512 A1* | 2/2003 | Wunderer | G01N 29/11 | 324/639 |
| 2006/0058672 A1* | 3/2006 | Klepper | G01S 15/8915 | 600/447 |
| 2009/0223295 A1* | 9/2009 | Kondo | G07D 7/08 | 73/627 |
| 2010/0132470 A1* | 6/2010 | Domke | G01N 29/348 | 73/642 |
| 2012/0061901 A1* | 3/2012 | Yamamoto | G01B 17/00 | 271/3.16 |
| 2013/0069299 A1* | 3/2013 | Matsuoka | B65H 5/06 | 271/10.01 |
| 2016/0131747 A1* | 5/2016 | Tang | G06F 3/0436 | 367/140 |
| 2017/0110504 A1* | 4/2017 | Panchawagh | B06B 1/0207 | |
| 2018/0131102 A1* | 5/2018 | Wang | H01Q 21/0025 | |
| 2018/0192994 A1* | 7/2018 | Katsube | B06B 1/0207 | |
| 2018/0221917 A1* | 8/2018 | Maruyama | G01N 29/221 | |

FOREIGN PATENT DOCUMENTS

| | | |
|---|---|---|
| JP | 2009-097942 A | 5/2009 |
| JP | 2012-185096 A | 9/2012 |
| JP | 2017-088269 A | 5/2017 |
| WO | WO-2017163755 A1 * | 9/2017 ............ G01N 29/11 |

* cited by examiner

FIG. 5
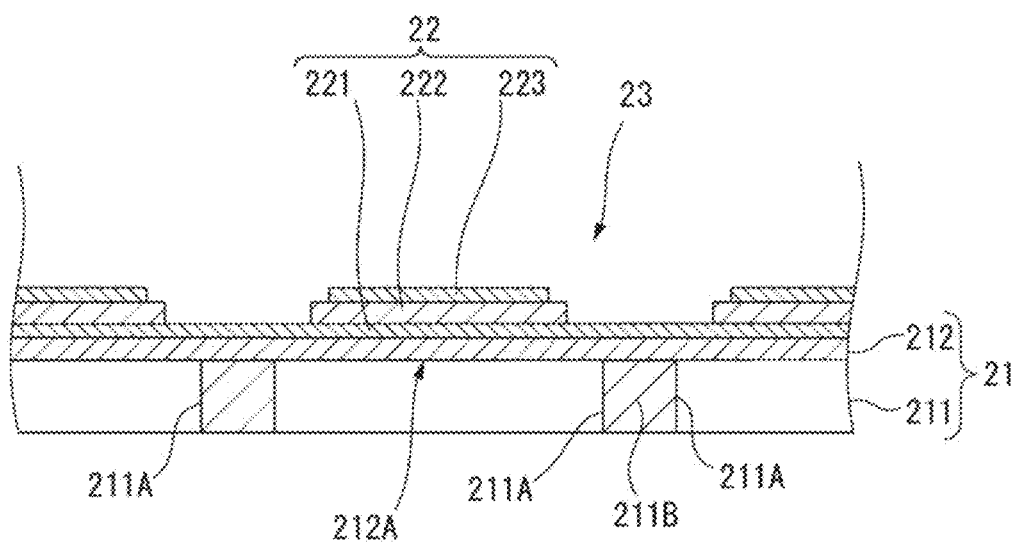
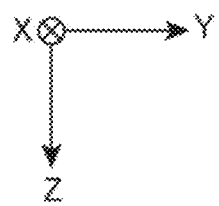
FIG. 6
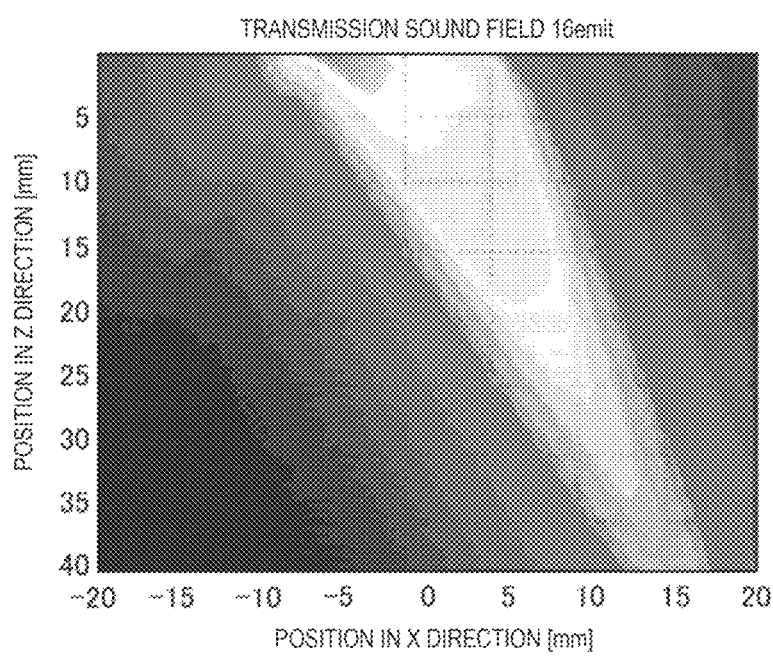

ULTRASONIC SENSOR, ELECTRONIC APPARATUS, AND METHOD OF DRIVING ULTRASONIC SENSOR

BACKGROUND

1. Technical Field

The present invention relates to an ultrasonic sensor, an electronic apparatus, and a method of driving the ultrasonic sensor.

2. Related Art

In the related art, a device for detecting a state of an object by using an ultrasonic wave (refer to, for example, JP-A-2017-88269).

The device described in JP-A-2017-88269 is a paper transporting device that transports a paper sheet (object) from a tray one by one. A multi-feed sensor that detects whether or not two or more sheets of paper are transported is provided in the paper transporting device. The multi-feed sensor includes a transmission unit that transmits an ultrasonic wave so as to pass through the paper and a reception unit that receives the ultrasonic wave passing through a paper surface. The multi-feed sensor causes the transmission unit to transmit the ultrasonic wave and causes the reception unit to receive the ultrasonic wave. At this time, in a case where two or more sheets of the transported paper overlap each other, the received signal goes to a low level, and thereby, it is possible to detect multi-feed of the paper sheets.

However, in the multi-feed sensor described above, if the ultrasonic wave transmitted by the transmission unit is reflected multiple times between the paper sheet and the transmission unit or between the reception unit and the paper sheet, or if the ultrasonic wave that wraps around the paper sheet is received by the reception unit, the received signal becomes unstable and it is difficult to detect the multi-feed. Accordingly, a configuration is adopted in which a direction (sound axis) of the ultrasonic wave transmitted from the transmission unit is incident obliquely with respect to a surface of an object and the reception unit is provided on the sound axis opposite to the transmission unit of the object.

However, in a case where a direction from the transmission unit to the reception unit is inclined with respect to the surface of the object, mounting angle errors of the transmission unit and the reception unit occur. In this case, there is a problem that the sound axis of the ultrasonic wave transmitted from the transmission unit is deviated from the direction from the transmission unit to the reception unit, and a voltage of a received signal output from the reception unit is decreased.

Although JP-A-2017-88269 is a device that detects multi-feed of the paper sheets, there is a similar problem in other ultrasonic sensors that obliquely transmit the ultrasonic wave to an object and receive the ultrasonic wave passing through the object, thereby, detect states (for example, a thickness of the object, a type of the object, and the like) of the object.

SUMMARY

An advantage of some aspects of the invention is to provide an ultrasonic sensor, an electronic apparatus, and a method of driving the ultrasonic sensor which can perform highly accurate detection of a state of an object.

An ultrasonic sensor according to an application example includes: a transmission unit that is disposed on a first axis which is inclined with respect to a normal line of a surface of an object; a reception unit that is provided on a side opposite to the transmission unit of the object, on the first axis; and a transmission control unit that controls drive of the transmission unit. The transmission unit includes a plurality of transmission elements that transmit ultrasonic waves, and the plurality of transmission elements are arranged in a first direction that intersects the first axis in a plane including the normal line and the first axis. The transmission control unit delay-drives the plurality of transmission elements to align a direction of the ultrasonic wave that is transmitted from the transmission unit with the first axis.

In this application example, a transmission unit includes a plurality of transmission elements, and by delay-driving the transmission elements, a transmission direction of ultrasonic waves which are transmitted from the transmission unit is controlled. That is, if the ultrasonic waves are transmitted from the respective transmission elements, ultrasonic waves having the same phase are strengthened to form wave surfaces of the ultrasonic waves. By delaying each transmission element, it is possible to control a travel direction of a wave surface of the ultrasonic waves. Thus, when the transmission unit and the reception unit are attached such that the ultrasonic waves are input from a direction inclined with respect to a normal line of an object, an attaching angle error is included in the transmission unit and the reception unit, and a deviation may occur on a sound axis, and a direction of the ultrasonic wave transmitted from the transmission unit can be finely adjusted to align the sound axis with a first axis. Thus, it is possible to suppress a decrease of a voltage of the received signal when the ultrasonic wave is received by the reception unit, and to detect a state of the object with a high accuracy based on the received signal output from the reception unit of the ultrasonic sensor.

In the ultrasonic sensor according to the application example, it is preferable that an arrangement interval between the plurality of transmission elements is one to two times a wavelength of the ultrasonic wave that is output from the transmission element.

Generally, in a case where ultrasonic waves are transmitted from a plurality of transmission elements and are combined together, a grating lobe is formed in addition to a formation position of a main lobe. The grating lobe can be prevented by setting $d<\lambda/(\sin\theta+1)$ when a wavelength of the ultrasonic wave is referred to as $\lambda$ and an arrangement interval between the transmission elements is referred to as $d$. Thus, in an ultrasonic wave transmission device having a plurality of transmission elements of related art in consideration of the grating lobe, the arrangement interval between the transmission elements is generally set to be smaller than the wavelength of the ultrasonic wave transmitted from the transmission element.

Thus, in order to prevent the grating lobe from being generated, it is necessary to dispose many transmission elements in the transmission unit, if the arrangement interval between the transmission elements is set to $d/\lambda<1$. In this case, a circuit scale for controlling each of the transmission elements is also complicated and large. For example, in a case where an ultrasonic sensor is mounted in an electronic apparatus such as a print device or an image scanner, if an ultrasonic sensor of a large circuit scale is mounted, a cost of the electronic apparatus increases, and a circuit arrangement space needs to be secured.

Meanwhile, in the ultrasonic sensor in which a transmission unit and a reception unit are arranged with an object interposed therebetween and in which the ultrasonic wave that is transmitted from the transmission unit and passes through the object is received by the reception unit, a thickness of the object through which the ultrasonic wave can pass is limited, and a distance between the transmission unit and the reception unit is approximately 20 mm. An inventor of the present application obtained the following two new findings in the ultrasonic sensor having a short distance between the transmission unit to the reception unit. First, in a case where the wavelength $\lambda$ of the ultrasonic wave transmitted from the transmission unit satisfies a range of $d/\lambda<2$, an influence of the grating lobe is reduced, and a decrease in accuracy of the ultrasonic sensor due to the influence is negligible. Second, in a case where the wavelength $\lambda$ of the ultrasonic wave transmitted from the transmission unit satisfies the range of $d/\lambda<2$, when each transmission element is driven, it is possible to change an arrival position of the ultrasonic wave at a depth position of approximately 20 mm to be a target. However, in a case where $d/\lambda>2$, it is impossible to change the arrival position of the ultrasonic wave with respect to the depth position. That is, in a case where $d/\lambda<2$ is satisfied, it is possible to control a transmission direction of the ultrasonic wave by delay-driving the transmission element, but in a case where $d/\lambda>2$ is satisfied, it is difficult to control the transmission direction of the ultrasonic waves by delay-driving the transmission element.

In the application example, the arrangement interval between the transmission elements is set so as to satisfy $1<\lambda/d<2$, based on the above findings. In this case, it is possible to suppress deterioration in accuracy of the ultrasonic sensor due to generation of the grating lobe, and to control the arrival position of the ultrasonic wave with respect to a desirable depth position by delay-driving the transmission element. Moreover, it is possible to reduce the number of arrangement of the transmission elements arranged in the transmission unit and to reduce the circuit scale. Thereby, the cost of the ultrasonic sensor can be reduced, and in a case where the ultrasonic sensor is mounted in the electronic apparatus, the cost of the electronic apparatus is also reduced.

In the ultrasonic sensor according to the application example, it is preferable that the ultrasonic sensor further includes n+1 transmission circuits in which the transmission elements that are arranged at every n interval in the first direction are set as one transmission control group, that are provided corresponding to the transmission control groups respectively, and that generate periodic drive voltages, and switching elements that are provided for the plurality of transmission elements respectively, and that are capable of switching between a connection position for connecting the transmission element to the transmission circuit corresponding to the transmission control group to which the transmission element belongs and a disconnection position for disconnecting the transmission element from the transmission circuit corresponding to the transmission control group to which the transmission element belongs, k is set to a natural number from 1 to n+1 and a k-th transmission circuit corresponding to the k-th transmission control group in the first direction generates the periodic drive voltage delayed by an integer multiple of a 1/(n+1) cycle with respect to the periodic drive voltage which is generated by the (k−1)-th transmission circuit, and the transmission control unit sequentially switches the switching elements corresponding to the transmission elements that are arranged in the first direction from the disconnection position to the connection position by delaying by the 1/(n+1) cycle.

In the application example with this configuration, it is assumed that n transmission elements are set as one transmission control group in the first direction. A transmission circuit is provided for each of the transmission control groups, and the generated periodic drive voltage is delayed by a 1/n+1 cycle. A transmission control unit sequentially switches switching elements from a disconnection position to a connection position in the first direction. That is, periodic drive voltages delayed by a 1/n cycle from the periodic drive voltage input to the k-th transmission element are sequentially input to the (n+1) transmission elements from the k-th to the (k+n)-th in the first direction. The periodic drive voltage delayed by an integer multiple of one cycle of the periodic drive voltage is input to the same transmission control group. Thereby, the periodic drive voltage delayed by a 1/(n+1) cycle is applied to the respective transmission elements arranged in the first direction, and thereby, the ultrasonic wave is transmitted in a direction corresponding to the delay time.

For example, in a case where n=1, the plurality of transmission elements are divided into a transmission control group including odd-numbered transmission elements and a transmission control group including even-numbered transmission elements. In this case, a transmission circuit corresponding to the transmission control group including the even-numbered transmission elements generates a periodic drive voltage delayed by a ½ cycle (half cycle) with respect to the periodic drive voltage generated by the transmission circuit corresponding to the transmission control group including the odd-numbered transmission elements. In addition, the transmission control unit switches the switching element for the first transmission element to a connection position, and then, delays the switching element by a half cycle of the periodic drive voltage to switch the switching element for the second transmission element to the connection position. The same applies to the switching elements for the third and subsequent transmission elements, and the switching elements are sequentially switched to the connection positions by being delayed by a half cycle of the periodic drive voltage.

In such a configuration, one transmission circuit may be provided for one transmission control group. Thus, a circuit scale can be reduced, a cost of the ultrasonic sensor can be reduced, and a circuit size can be reduced as compared with the case where the individual transmission circuits are provided for each transmission element.

In the ultrasonic sensor according to the application example, it is preferable that the ultrasonic sensor further includes transmission circuits that generate periodic drive voltages, and switching elements that are provided for the plurality of transmission elements respectively and that are capable of switching between a connection position for connecting the transmission element to the transmission circuit and a disconnection position for disconnecting the transmission element from the transmission circuit. It is preferable that the transmission control unit delays the switching elements corresponding to the transmission elements that are arranged in the first direction by an integral multiple of a cycle of the periodic drive voltage to sequentially switch from the disconnection position to the connection position.

In the application example with this configuration, the periodic drive voltages are sequentially input to the plurality of transmission elements arranged in the first direction with a delay time of an integer multiple of the cycle of the periodic drive voltage. In such a configuration, one transmission circuit may be provided for the plurality of transmission elements. Thus, a circuit scale can be reduced, a cost of the ultrasonic sensor can be reduced, and a circuit size can be reduced as compared with a case where the individual transmission circuits are provided for each transmission element.

In the ultrasonic sensor according to the application example, it is preferable that the ultrasonic sensor further includes a transmission circuit that generates a periodic drive voltage, and a multiplexer that is connected to the plurality of transmission elements and the transmission circuit and capable of switching the transmission elements of an output destination of the periodic drive voltage which is input from the transmission circuit. It is preferable that the transmission control unit causes the multiplexer to sequentially switch the transmission elements outputting the periodic drive voltage in the first direction by delaying a cycle of the periodic drive voltage by an integer multiple.

Also in the application example with this configuration, periodic drive voltages are sequentially input to a plurality of transmission elements arranged in the first direction with a delay time of an integer multiple of a cycle of the periodic drive voltage in the same manner as in the above-described application example. In such a configuration, one transmission circuit may be provided for the plurality of transmission elements. Thus, a circuit scale can be reduced, a cost of the ultrasonic sensor can be reduced, and a circuit size can be reduced as compared with a case where the individual transmission circuits are provided for each transmission element. In addition, one multiplexer may be provided for each transmission element, and a circuit configuration can be simplified as compared with a case where switching elements are provided for each of the plurality of transmission elements.

In the ultrasonic sensor according to the application example, it is preferable that the transmission control unit changes a cycle of the periodic drive voltage that is generated by the transmission circuit.

In the application example with this configuration, as described above, the periodic drive voltages are sequentially input to each transmission element by delaying the periodic drive voltages by a 1/(n+1) cycle of the periodic drive voltage or an integer multiple of a cycle of the periodic drive voltage. In the application example, by changing the cycle of the periodic drive voltage, a delay time of each transmission element can be adjusted, and a transmission direction of the ultrasonic wave can be controlled.

An electronic apparatus according to another application example includes: the ultrasonic sensor of the application example described above; and a state detection unit that detects a state of the object in accordance with an output from the reception unit of the ultrasonic sensor.

In this application example, as described above, when a transmission unit and a reception unit are attached to an electronic apparatus, even in a case where a sound axis of the ultrasonic wave transmitted from the transmission unit is deviated with respect to the reception unit by an attachment angle error of the transmission unit and the reception unit, a transmission direction of ultrasonic waves can be controlled, and the sound axis can be aligned with a direction toward the reception unit by delay-driving the plurality of transmission elements of the transmission unit. Thus, the electronic apparatus can detect a state of an object with a good institution.

A a method of driving an ultrasonic sensor according to another application example is a method of driving an ultrasonic sensor which includes a transmission unit that is disposed on a first axis which is inclined with respect to a normal line of a surface of an object, and a reception unit that is provided on a side opposite to the transmission unit of the object, on the first axis, and in which the transmission unit includes a plurality of transmission elements that transmit ultrasonic waves, and the plurality of transmission elements are arranged in a first direction that intersects the first axis in a plane including the normal line and the first axis, including: detecting a voltage of a received signal that is output when the ultrasonic wave is received by the reception unit by setting m as a natural number greater than or equal to 1, and by delaying a periodic drive voltage of a predetermined cycle by an integer multiple of a 1/m cycle of the periodic drive voltage to input the plurality of transmission elements which are arranged in the first direction; setting a cycle of the periodic drive voltage, based on the voltage of the received signal that is detected in the detecting the voltage; detecting a state of the object, based on the voltage of the received signal that is received by the reception unit by delaying the periodic drive voltages of the cycle which is set in the setting of the cycle by the integer multiple of the 1/m cycle of the periodic drive voltage to input the plurality of transmission elements which are aligned in the first direction and to drive the plurality of transmission elements which are aligned in the first direction, in which in the detecting the voltage, the voltage of the received signal for each cycle is detected by changing the cycle of the periodic drive voltage, and in which in the setting the cycle, a cycle is selected when the voltage of the received signal reaches a maximum value and the cycle is set as a cycle that is used in the detecting the state.

In this application example, in voltage detection, periodic drive voltages are delayed by a 1/m cycle of the periodic drive voltage to sequentially input to a plurality of transmission elements, and voltages of received signals output from the reception unit are detected. At this time, the voltages of the received signals at the time of changing cycles of the periodic drive voltages are detected. Then, in cycle setting, a cycle in which the voltage of the received signal detected in the voltage detection becomes a maximum value is specified and is set as a cycle of the periodic drive voltage used in state detection. In the state detection, the periodic drive voltages of the set cycle are delayed by 1/m and are input to the respective transmission elements, and a state of an object is detected based on the received signal.

With this configuration, when the transmission unit and the reception unit are attached to an electronic apparatus or the like, even in a case where an attachment angle error occurs when each transmission element of the transmission unit is delay-driven, a sound axis of the ultrasonic wave transmitted from the transmission unit can be adjusted so as to direct the reception unit, and the state of the object can be detected with a high accuracy.

BRIEF DESCRIPTION OF THE DRAWINGS

The invention will be described with reference to the accompanying drawings, wherein like numbers reference like elements.

FIG. 5 is a cross-sectional view of a part of the transmission unit when line A-A in FIG. 4 is cut.

FIG. 6 is a view illustrating a sound pressure distribution of ultrasonic waves when a transmission element pitch is d=dg.

DESCRIPTION OF EXEMPLARY EMBODIMENTS

First Embodiment

Hereinafter, a first embodiment according to the invention will be described.

Figure 1:
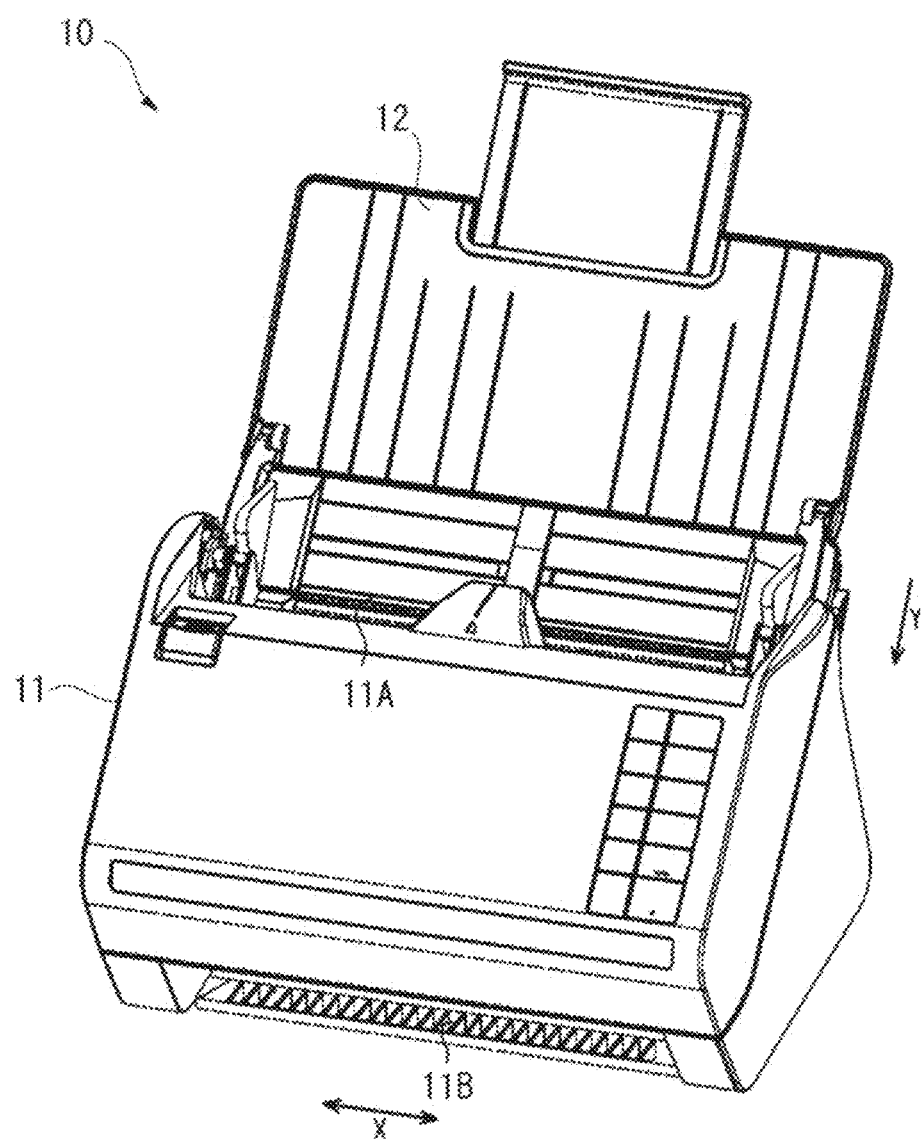
FIG. 1 is an external view illustrating a schematic configuration of an image scanner according to a first embodiment.
Figure 2:
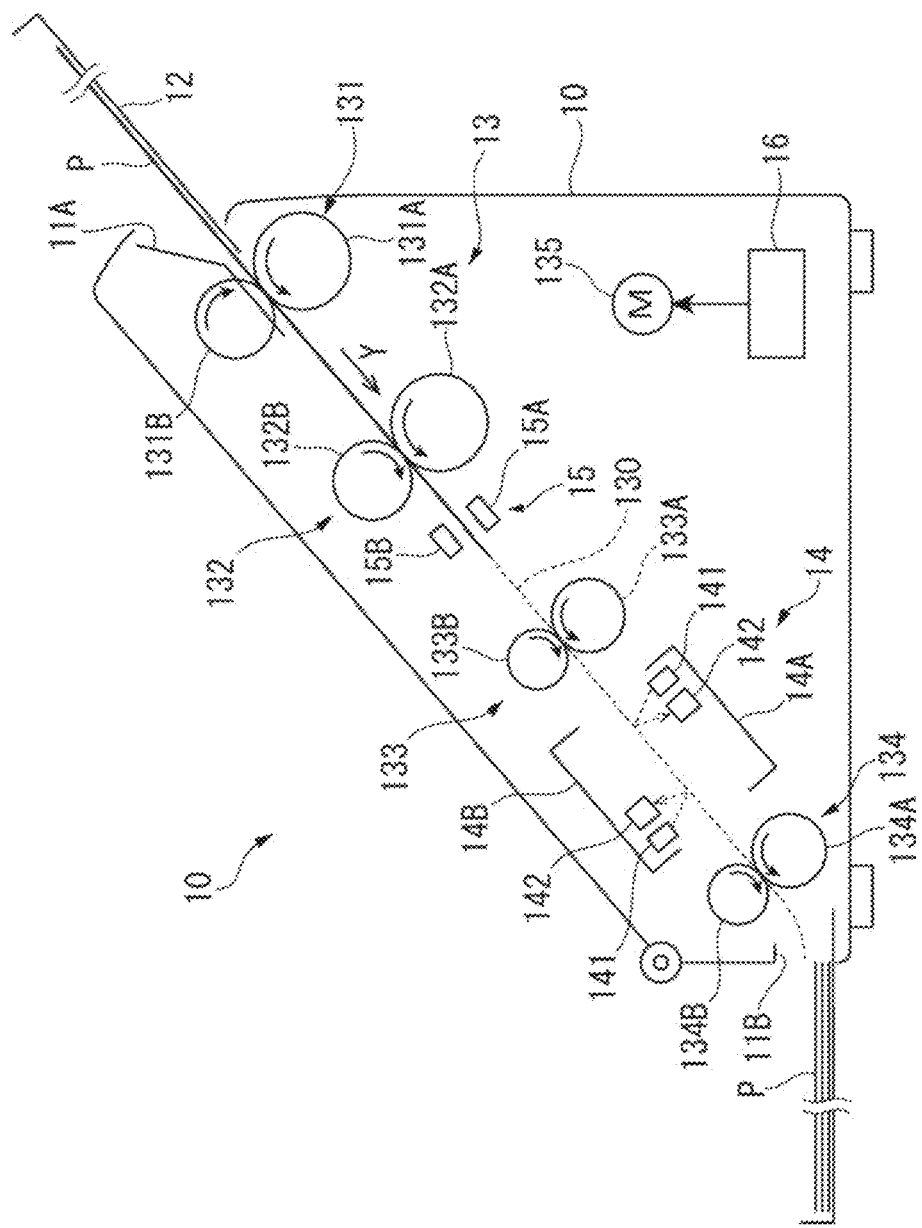
FIG. 2 is a side sectional view schematically illustrating a transport portion of the image scanner according to the first embodiment.

FIG. 1 is an external view illustrating a schematic configuration of an image scanner 10 according to the present embodiment. FIG. 2 is a side sectional view schematically illustrating a transport portion of the image scanner 10.

Schematic Configuration of Image Scanner 10

As illustrated in FIG. 1, the image scanner 10 according to the present embodiment includes a device main body (hereinafter, abbreviated as a main body 11) and a paper support 12 on which a paper sheet P (see FIG. 2) which is an object is placed. As illustrated in FIG. 2, a transport portion 13 for transporting the paper sheet P, a scan unit 14 for reading an image of the transported paper sheet P, an ultrasonic sensor 15 (multi-feed sensor) that detects multi-feed of the paper sheet P, and a control unit 16 that controls the image scanner 10 are provided inside the main body 11. Although the paper sheet P is exemplified as an object, the invention is not limited to this, and various media such as a film and a cloth may be used as the object.

As illustrated in FIGS. 1 and 2, the main body 11 is provided with a feed hole 11A at a connection position with the paper support 12. The paper sheet P placed on the paper support 12 is transported to the feed hole 11A one by one. The transported paper sheet P is transported by the transport portion 13 along a predetermined transport path 130 (see FIG. 2) in the main body 11. Then, after the image is read by the scan unit 14 at the reading position during the transport, the paper sheet is discharged from a discharge hole 11B which opens in a front lower part of the main body 11.

Configuration of Transport Portion 13

The transport portion 13 transports a plurality of sheets of paper sheet P stacked (set) on the paper support 12 one by one in a transport direction (Y direction). That is, the transport portion 13 feeds the paper sheet P sent from the feed hole 12A into the main body 11 while guiding the paper sheet and transports the fed paper sheet P along the transport path 130.

More specifically, the transport portion 13 includes a first feed roller pair 131 disposed at an upstream end position of the transport path 130 in the main body 11, and a second feed roller pair 132 disposed at a downstream side in a transport direction with respect to the first feed roller pair 131. Furthermore, the transport portion 13 includes a first transport roller pair 133 disposed on an upstream side with a reading position of the paper sheet P interposed therebetween in the Y direction, and a second transport roller pair 134 disposed on the downstream side.

The first feed roller pair 131 is configured by a first drive roller 131A and a first driven roller 131B. Likewise, the second feed roller pair 132 is configured by a second drive roller 132A and a second driven roller 132B.

The first transport roller pair 133 is configured by a third drive roller 133A and a third driven roller 133B. Likewise, the second transport roller pair 134 is configured by a fourth drive roller 134A and a fourth driven roller 134B. Each of the driven rollers 131B to 134B is driven (rotated) by a rotation of each of the drive rollers 131A to 134A.

Each of the drive rollers 131A to 134A configuring each of the roller pairs 131 to 134 is rotationally driven by power of the transport motor 135 which is a power source thereof. The transport motor 135 is controlled by the control unit 16 to drive the respective drive rollers 131A to 134A under control of the control unit 16.

The second driven roller 132B configuring the second feed roller pair 132 is a retard roller and a friction coefficient of an outer peripheral surface of the second driven roller 132B with respect to the paper sheet P is larger than friction coefficient of an outer peripheral surface of the second drive roller 132A with respect to the paper sheet P. Accordingly, the second feed roller pair 132 functions as a separation mechanism that separates the plurality of sheets of paper sheet P one by one and sends out the paper sheet to the downstream side in the Y direction. Thus, the plurality of sheets of paper sheet P stacked on the paper support 12 by the rotation of the first feed roller pair 131 are sequentially fed one by one from the lowermost one into the main body 11 from the feed hole 11A, are separated one by one by the rotation of the second feed roller pair 132, and are fed to the downstream side in the Y direction.

Configuration of Scan Unit 14

As illustrated in FIG. 2, the reading position for reading the image of the paper sheet P is provided and the scan unit 14 is provided, between the first transport roller pair 133 and the second transport roller pair 134 in the transport path 130.

The scan unit 14 includes, for example, a first scan unit 14A and a second scan unit 14B which are provided on both sides of the transport path 130. The scan unit 14 includes a light source 141 capable of applying light onto the paper sheet P being transported and an image sensor 142 extending in a main scan direction (X direction intersecting the Y direction which is the transport direction). In a normal reading mode for reading one surface (front surface) of the paper sheet P, the first scan unit 14A performs a reading operation, and in a double surface reading mode for reading both surfaces (front and back surfaces) of the paper sheet P, the first scan unit 14A and the second scan unit 14B perform a read operation. The light source 141 and the image sensor 142 configuring the scan unit 14 (14A and 14B) are connected to the control unit 16, and perform scan processing to read the image of the paper sheet P under the control of the control unit 16.

Configuration of Ultrasonic Sensor 15

The ultrasonic sensor 15 is provided at a position between the second feed roller pair 132 and the first transport roller pair 133 in the transport path 130. The ultrasonic sensor 15 is a multi-feed sensor and detects multi-feed of the paper sheet P transported by the transport portion 13.

Figure 3:
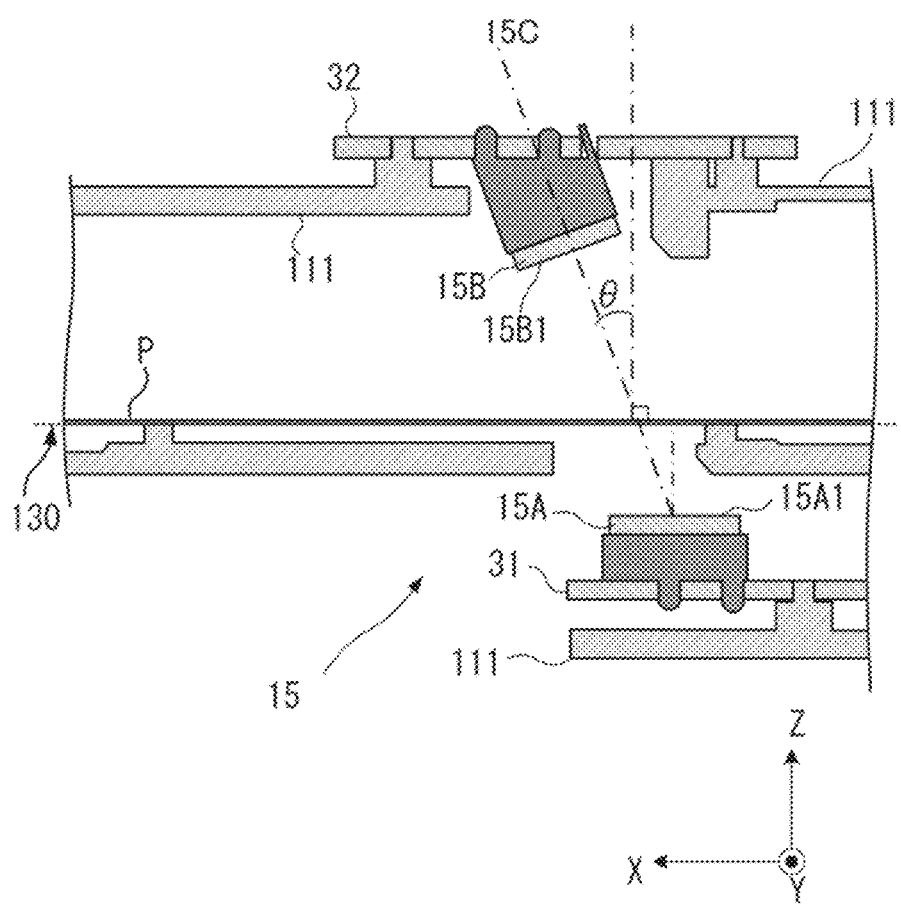
FIG. 3 is a schematic view illustrating a schematic configuration of an ultrasonic sensor according to the first embodiment.

FIG. 3 is a view illustrating a schematic configuration of the ultrasonic sensor 15.

As illustrated in FIG. 3, an ultrasonic wave is transmitted from the transmission unit 15A so as to pass through the paper sheet P transported by the transport portion 13, and is received by the reception unit 15B, and thereby, the ultrasonic sensor 15 detects multi-feed. That is, the transmission unit 15A and the reception unit 15B are disposed so as to interpose the transport path 130 therebetween.

As illustrated in FIG. 3, the transmission unit 15A and the reception unit 15B are attached to the main body 11 such that a sensor center axis 15C (first axis) passing through the center of the transmission unit 15A and the center of the reception unit 15B is inclined at a predetermined angle θ with respect to a normal line of a surface of the paper sheet P which is transported to the transport path 130.

That is, in a case where the sensor center axis 15C coincides with a normal line direction of the surface of the paper sheet P, there is a risk that the ultrasonic wave transmitted from the transmission unit 15A is reflected multiple time between the paper sheet P and the transmission unit 15A. In addition, there is a risk that ultrasonic waves passing through the paper sheet P are reflected multiple times between the reception unit 15B and the paper sheet P. In this case, the reception unit 15B also receives the ultrasonic waves reflected multiple times in addition to ultrasonic wave (ultrasonic waves desired to be measured) which is output from the transmission unit 15A, passes through the paper sheet P, and is received by the reception unit 15B, and thereby, accurate multi-feed detection cannot be made.

In contrast to this, by inclining the sensor center axis 15C with respect to the normal line of the surface of the paper sheet P, it is possible to reduce for the reception unit 15B to receive unnecessary ultrasonic wave components such as the ultrasonic waves reflected multiple times and to detect multi-feed with a high accuracy.

The transmission unit 15A is attached to the main body via a transmission circuit substrate 31 and the reception unit 15B is attached to the main body via a reception circuit substrate 32. As illustrated in FIG. 3, the transmission circuit substrate 31 and the reception circuit substrate 32 are engaged at and fixed to predetermined positions of a substrate support portion 111 fixed inside the main body 11. In the present embodiment, the transmission circuit substrate 31 and the reception circuit substrate 32 are fixed so as to be substantially parallel to the transport path 130. In the present embodiment, the transmission unit 15A is fixed such that a transmission surface 15A1 is parallel to a substrate surface of the transmission circuit substrate 31. Meanwhile, the reception unit 15B is fixed such that a reception surface 15B1 is inclined at an angle θ with respect to the substrate surface of the reception circuit substrate 32.

Here, an example in which the transmission circuit substrate 31 and the reception circuit substrate 32 are independently provided is illustrated, the invention is not limited to this, and the transmission circuit substrate 31 and the reception circuit substrate 32 may be configured so as to be integrally provided on one substrate. In addition, at least one of the transmission circuit substrate 31 and the reception circuit substrate 32 may be configured by a plurality of substrates.

Element Configuration of Transmission Unit 15A

The transmission unit 15A configuring the ultrasonic sensor 15 will be described more specifically.

Figure 4:
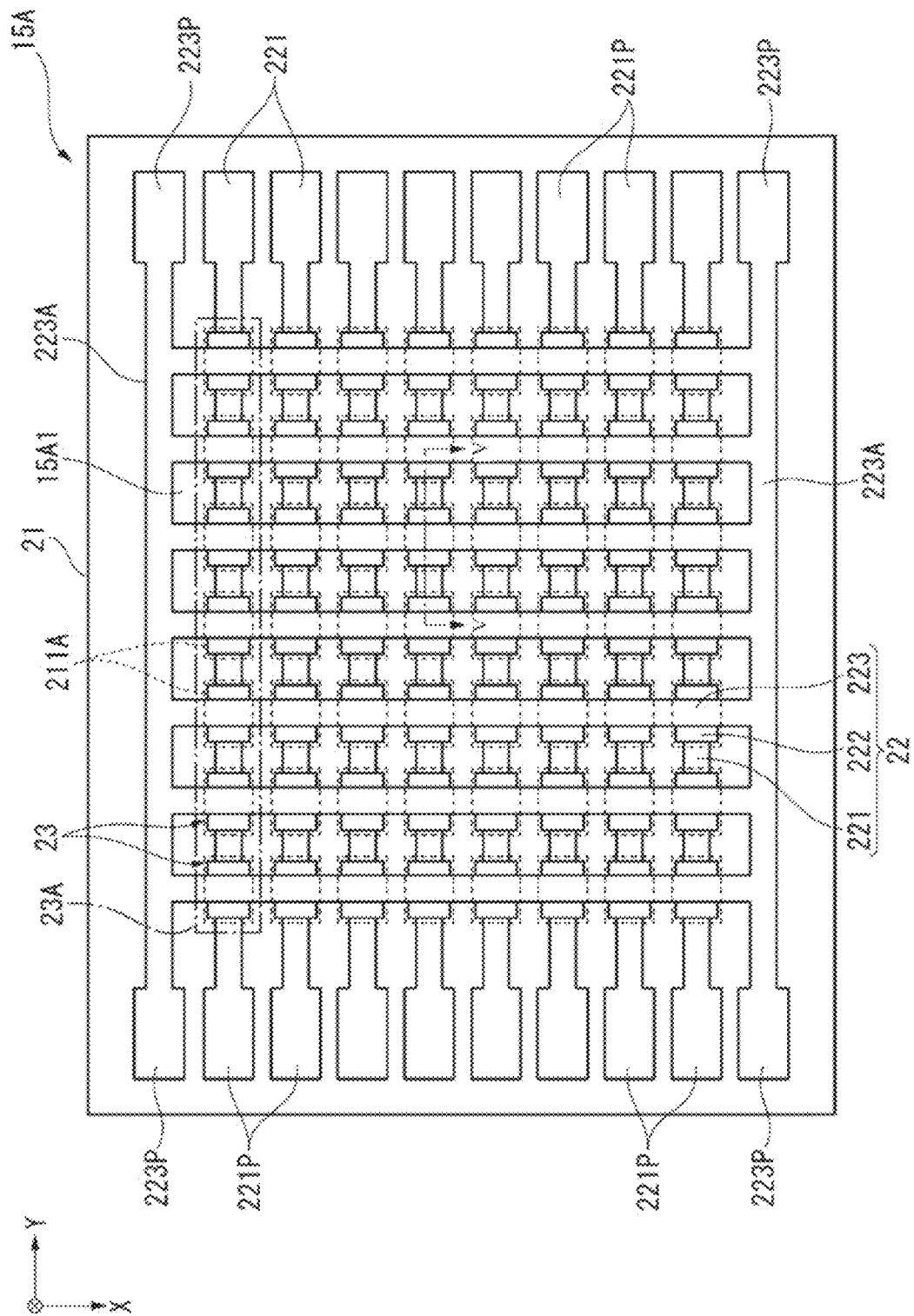
FIG. 4 is a plan view of a transmission unit configuring the ultrasonic sensor according to the first embodiment.

FIG. 4 is a plan view illustrating a schematic configuration of the transmission unit 15A. FIG. 5 is a sectional view of a part of the transmission unit 15A.

As illustrated in FIGS. 4 and 5, the transmission unit 15A includes an element substrate 21 and a piezoelectric element 22. In the present embodiment, a substrate thickness direction (Z direction) of the element substrate 21 coincides (or substantially coincides) with the normal direction of the paper sheet P, and an X direction intersecting the Z direction coincides (or substantially coincides) with a main scan direction of the image scanner 10, and the Y direction crossing the Z direction and the X direction is the transport direction. In addition, the Z direction (direction toward the +Z side) becomes a direction (direction toward the paper sheet P) in which the ultrasonic wave is transmitted. The X direction becomes a first direction according to the invention.

Configuration of Element Substrate 21

As illustrated in FIG. 5, the element substrate includes a substrate main body portion 211 and a vibration film 212 provided on a −Z side of the substrate main body portion 211.

The substrate main body portion 211 is a substrate that supports the vibration film 212, and is configured by, for example, a semiconductor substrate such as Si. Here, as illustrated in FIG. 4, the element substrate 21 is provided with a plurality of openings 211A arranged in a two-dimensional array shape in the X direction and the Y direction in a plan view viewed from the Z direction.

In the present embodiment, the respective openings 211A are through-holes that penetrate through a substrate thickness direction (Z direction) of the substrate main body portion 211, and the vibration film 212 is formed so as to close one end side (−Z side) of the through-hole.

The vibration film 212 is configured by, for example, a stacking body or the like of $SiO_2$, or $SiO_2$ and $ZrO_2$, and is provided on the −Z side of the substrate main body portion 211. A thickness of the vibration film 212 is sufficiently small with respect to the substrate main body portion 211. The vibration film 212 is supported by a wall portion 211B (see FIG. 5) of the substrate main body portion 211 configuring an opening 211A and closes the −Z side of the opening 211A. In the vibration film 212, a portion (a region closing the opening 211A) overlapping the opening 211A in a plan view configures the vibration portion 212A. That is, the opening 211A defines an outer edge of the vibration portion 212A of the vibration film 212. The vibration portion 212A becomes a vibration region that can be vibrated by the piezoelectric element 22.

Configuration of Piezoelectric Element 22

In the present embodiment, the piezoelectric element 22 is provided at a position overlapping each vibration portion 212A on one surface (surface on the −Z side) of the vibration film 212 and in a plan view as viewed from the Z direction. As illustrated in FIG. 5, the piezoelectric element 22 is configured by sequentially stacking a first electrode 221, a piezoelectric film 222, and a second electrode 223 on a vibration film 212.

Specifically, as illustrated in FIG. 4, the first electrode 221 is formed linearly in the Y direction. Both end portions (±Y side end portion) of the first electrode 221 become, for example, first electrode terminals 221P which are connected to the transmission circuit substrate 31 for controlling the transmission unit 15A.

In addition, the second electrode 223 is linearly formed in the X direction. A ±X side end portion of the second electrode 223 is connected to a common electrode line 223A. The common electrode line 223A connects a plurality of second electrodes 223 arranged in the X direction, and both end portions (±Y side end portions) of the common electrode line 223A are connected to the transmission circuit substrate 31, thereby, forming electrode terminals 223P.

The piezoelectric film 222 is formed of a thin film of a piezoelectric material such as lead zirconate titanate (PZT).

Here, one ultrasonic wave transducer (transmission element 23) is configured by one vibration portion 212A in the vibration film 212 and the piezoelectric element 22 provided on the vibration portion 212A. Thus, as illustrated in FIG. 4, a plurality of transmission elements 23 are arranged in the transmission unit 15A in the X direction and the Y direction.

In the transmission unit 15A according to the present embodiment, the first electrodes 221 are common to the plurality of transmission elements 23 arranged in the Y direction, and a transmission string 23A (see FIG. 4) of one channel (Ch) is configured by the plurality of transmission elements 23 arranged in the Y direction thereof. As a plurality of transmission strings 23A of 1 Ch are arranged side by side in the Y direction, the transmission unit 15A having a one-dimensional array structure is configured.

In the transmission element 23 having such a configuration, a periodic drive voltage of a predetermined frequency is applied between the first electrode 221 and the second electrode 223, and thereby, the piezoelectric film 222 expands and contracts, and the vibration portion 212A of the vibration film 212 provided with the piezoelectric element 22 vibrates at a frequency corresponding to an opening width of the opening 211A and the like. Thereby, an ultrasonic wave is transmitted from the +Z side (opening 211A side) of the vibration portion 212A.

The transmission unit 15A according to the present embodiment controls a transmission direction of the ultrasonic wave by changing input timing of the periodic drive voltage to the transmission string 23A aligned in the X direction. That is, by combining the ultrasonic waves transmitted from the plurality of transmission elements 23, wave surfaces of the ultrasonic waves are formed. By delaying the input timing of the periodic drive voltage to each transmission string 23A, a travel direction of the wave surface of the ultrasonic wave can be controlled in a predetermined angle direction. For example, in a case where a transmission direction of the ultrasonic wave is inclined to the +X side with respect to the Z direction (normal line direction of the paper sheet P) and is transmitted, the input timing of the periodic drive voltage is delayed from the transmission string 23A at the −X side end portion in the X direction toward the +X side. In addition, in a case where the transmission direction of the ultrasonic wave is obliquely transmitted from the Z direction to the −X side, the input timing of the periodic drive voltage is delayed from the transmission string 23A at the +X side end portion in the X direction toward the −X side. As illustrated in FIG. 3, in the present embodiment, the reception unit 15B is disposed on the +X side with respect to the transmission unit 15A, and thereby, the transmission strings 23A are sequentially driven from the −X side end portion toward the +X side.

Figure 7:
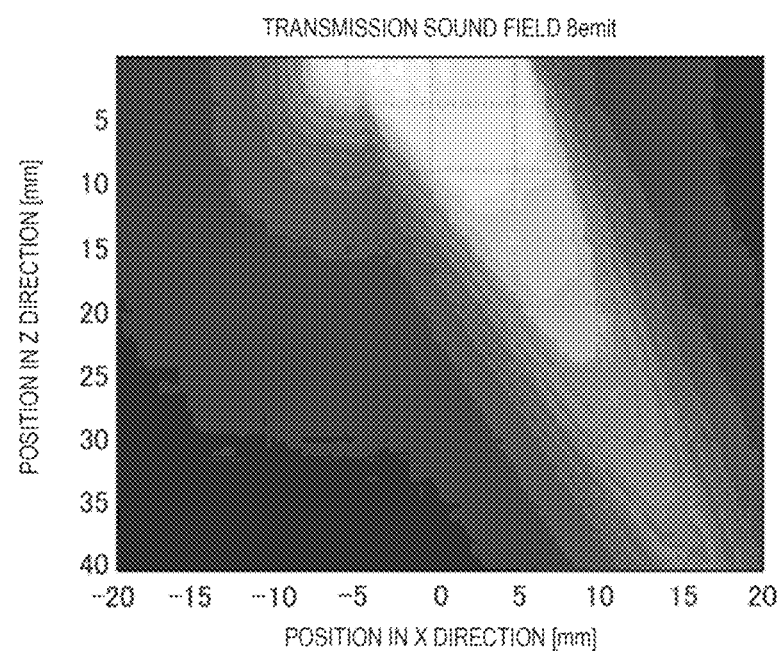
FIG. 7 is a view illustrating the sound pressure distribution of the ultrasonic waves when the transmission element pitch is d=2 dg.
Figure 8:
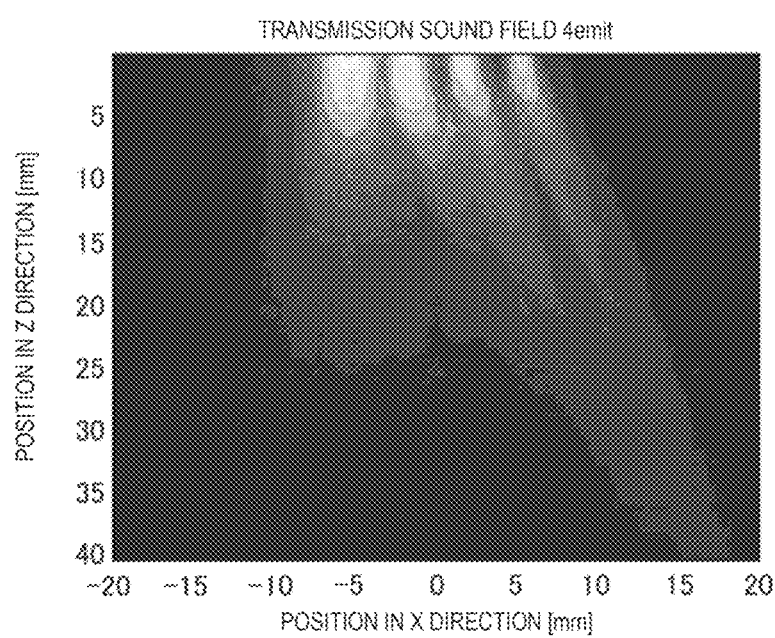
FIG. 8 is a view illustrating the sound pressure distribution of the ultrasonic waves when the transmission element pitch is d>2 dg.

FIG. 6 is a diagram illustrating a sound pressure distribution of ultrasonic waves in a case where a transmission element pitch d is d=dg. FIG. 7 is a diagram illustrating the sound pressure distribution of the ultrasonic waves in a case where the transmission element pitch d is d=2 dg. FIG. 8 is a diagram illustrating the sound pressure distribution of the ultrasonic waves in a case where the transmission element pitch d is d>2 dg. FIGS. 6 to 8 illustrate the sound pressure distributions of the ultrasonic waves depending on light and shade of a color and illustrate that a part (a white part) with a light color indicates a high sound pressure.

Here, "dg" indicates a maximum value of the transmission element pitch at which a grating lobe is not generated when the ultrasonic wave is transmitted from the transmission unit 15A. Generally, if a wavelength of the ultrasonic wave output from the transmission element 23 is referred to as λ and a distance (transmission element pitch) between the transmission elements 23 is referred to as d, a condition in which no grating lobe is generated is $d<\lambda/(\sin \theta+1)$. In FIGS. 6 and 7, a transmission sound field denotes a transmission surface 15A1 of the transmission unit 15A, FIG. 6 illustrates an example in which 16 transmission strings 23A are arranged on the transmission surface 15A1, FIG. 7 illustrates an example in which eight transmission strings 23A are arranged, and FIG. 8 illustrates an example in which four transmission strings 23A are arranged.

Figure 9:
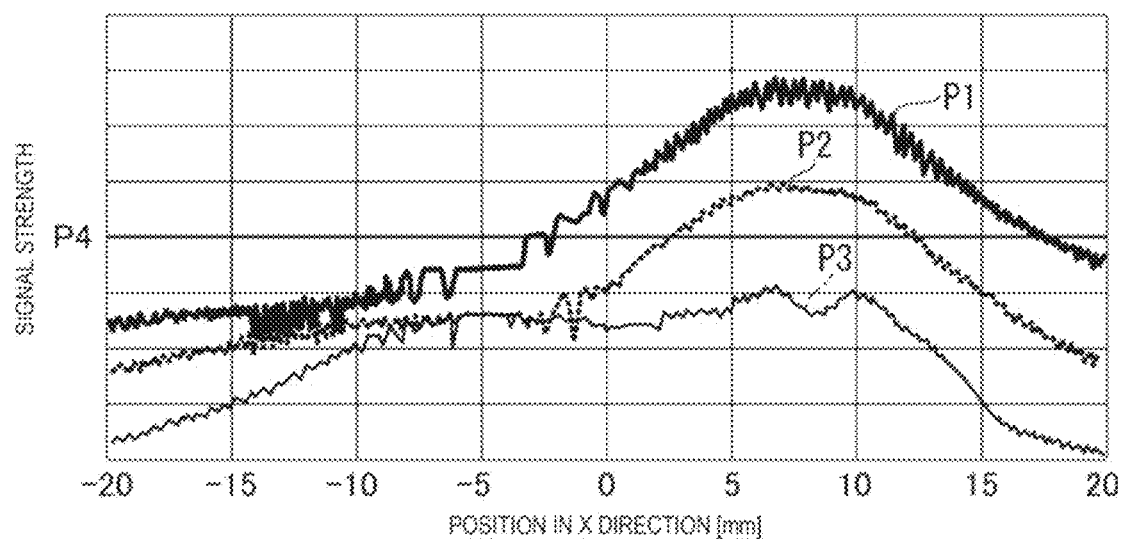
FIG. 9 is a view illustrating a sound pressure strength distribution at a position where a distance (depth) from the transmission unit is 20 mm.

FIG. 9 is a diagram illustrating a sound pressure strength distribution at a position where a position (depth) in the Z direction is 20 mm, when the ultrasonic wave is transmitted in the direction of 22° with respect to the Z direction from the transmission unit 15A. In FIG. 9, a curve P1 corresponds to FIG. 6 (d=dg), a curve P2 corresponds to FIG. 7 (d=2 dg), and a curve P3 corresponds to FIG. 8 (d>2 dg).

As described in the present embodiment, in a case where the ultrasonic waves are transmitted from the transmission unit 15A and the ultrasonic waves passing through the paper sheet P are received by the reception unit 15B, it is sufficient if there is a distance of approximately 20 mm as a distance between the transmission unit 15A and the reception unit 15B. Here, in a case where the transmission element pitch d is d≤2 dg, as illustrated in FIGS. 6, 7, and 9, the ultrasonic wave of a predetermined sound pressure or higher arrives at a distance of approximately 20 mm from the transmission unit 15A, and a signal strength of the received signal output from the reception unit 15B is equal to or greater than a threshold P4. Meanwhile, as illustrated in FIGS. 8 and 9, in a case where the transmission element pitch d is d>2 dg, the ultrasonic wave cannot be secured at a position (position of approximately 20 mm in the present embodiment) of a desirable depth from the transmission unit 15A, and the signal strength of the received signal from the reception unit 15B also is less than the threshold P4.

That is, in the present embodiment, as described above, by delay-driving the plurality of transmission strings 23A, a transmission direction of the ultrasonic wave is controlled so as to direct toward the reception unit 15B. At this time, if an interval (the transmission element pitch d) of the transmission string 23A is set to d>2 dg, the ultrasonic waves of sufficient sound pressure cannot be transmitted to the position of the desirable depth from the transmission unit 15A, and the transmission direction of the ultrasonic wave is also hard to control.

In contrast to this, by setting the transmission element pitch d to d≤2 dg, the transmission unit 15A can output the ultrasonic wave reaching the position of the desirable depth with a sufficient sound pressure, and it is possible to accurately control the transmission direction of the ultrasonic wave.

In addition to this, as illustrated in FIG. 8, in a case where the transmission element pitch d is d>2 dg, the grating lobes are formed in a plurality of directions. If the grating lobes are generated, there is a risk that the ultrasonic wave wraps around the paper sheet P to be received by the reception unit 15B and accuracy of the multi-feed detected by the ultrasonic sensor 15 is decreased. In contrast to this, as illustrated in FIGS. 6 and 7, when the transmission element pitch d is set to d≤2 dg, no grating lobe is observed in a depth of about 20 mm, and a main lobe can be formed such that the sound pressure strength reaches a peak in a predetermined direction.

Meanwhile, if the transmission element pitch d is reduced, more transmission strings 23A need to be formed in the transmission unit 15A. In the present embodiment, a direction of the ultrasonic wave transmitted from the transmission unit 15A is controlled by delaying a periodic drive voltage input to the transmission string 23A. In this case, it is necessary to form the transmission surface 15A1 having a certain area in the transmission unit 15A in order to secure the transmission sound pressure. Accordingly, as the transmission element pitch d decreases, the number of the transmission elements 23 and the transmission strings 23A arranged in the transmission unit 15A increases.

For example, in the present embodiment, a width of the transmission surface 15A1 (see FIGS. 3 and 4) of the transmission unit 15A in the X direction is 10 mm, and the transmission strings 23A are arranged at equal intervals within the 10 mm range, and thereby, the transmission direction of the ultrasonic wave is controlled. Here, in a case where the ultrasonic wave (wavelength of approximately 600 μm) of, for example, 560 kHz is transmitted from each transmission element 23, at least eight (8 Ch or more) transmission strings 23A may be formed so as to accurately control the transmission direction of the ultrasonic wave.

However, if the number of transmission strings 23A increases, a circuit configuration for driving the transmission strings 23A is also complicated and a cost of the ultrasonic sensor 15 increases. For example, in the present embodiment, switching elements 311 (see FIG. 10) are connected to the respective transmission strings 23A. Thus, if the number of transmission strings 23A increases, the number of switching elements 311 increases, and a wiring configuration for the respective switching elements 311 is also complicated. Also in the transmission unit 15A, the wiring configuration is complicated and a wiring width is small, and thereby, a wiring resistance also increases.

Therefore, in the ultrasonic sensor 15 according to the present embodiment, the transmission element pitch d of the transmission element 23 (transmission string 23A) is formed so as to satisfy dg<d≤2 dg, that is, λ<d≤2λ. Thereby, it is possible to reduce the number of arrangement of the transmission strings 23A while achieving a highly accurate transmission control of the ultrasonic wave in the transmission unit 15A and suppressing generation of the grating lobes, and it is possible to simplify the circuit configuration. For example, in a case where the transmission element pitch d is set to d=2 dg and the transmission element 23 (transmission string 23A) is disposed in the transmission unit 15A having a width of 10 mm in the X direction, the number of transmission strings 23A becomes 8 Ch, and it is possible to reduce the number of wires and the number of switching elements 311 to half as compared with a case where the transmission element pitch d is set to d=dg.

Circuit Configuration of Transmission Unit 15A

Figure 10:
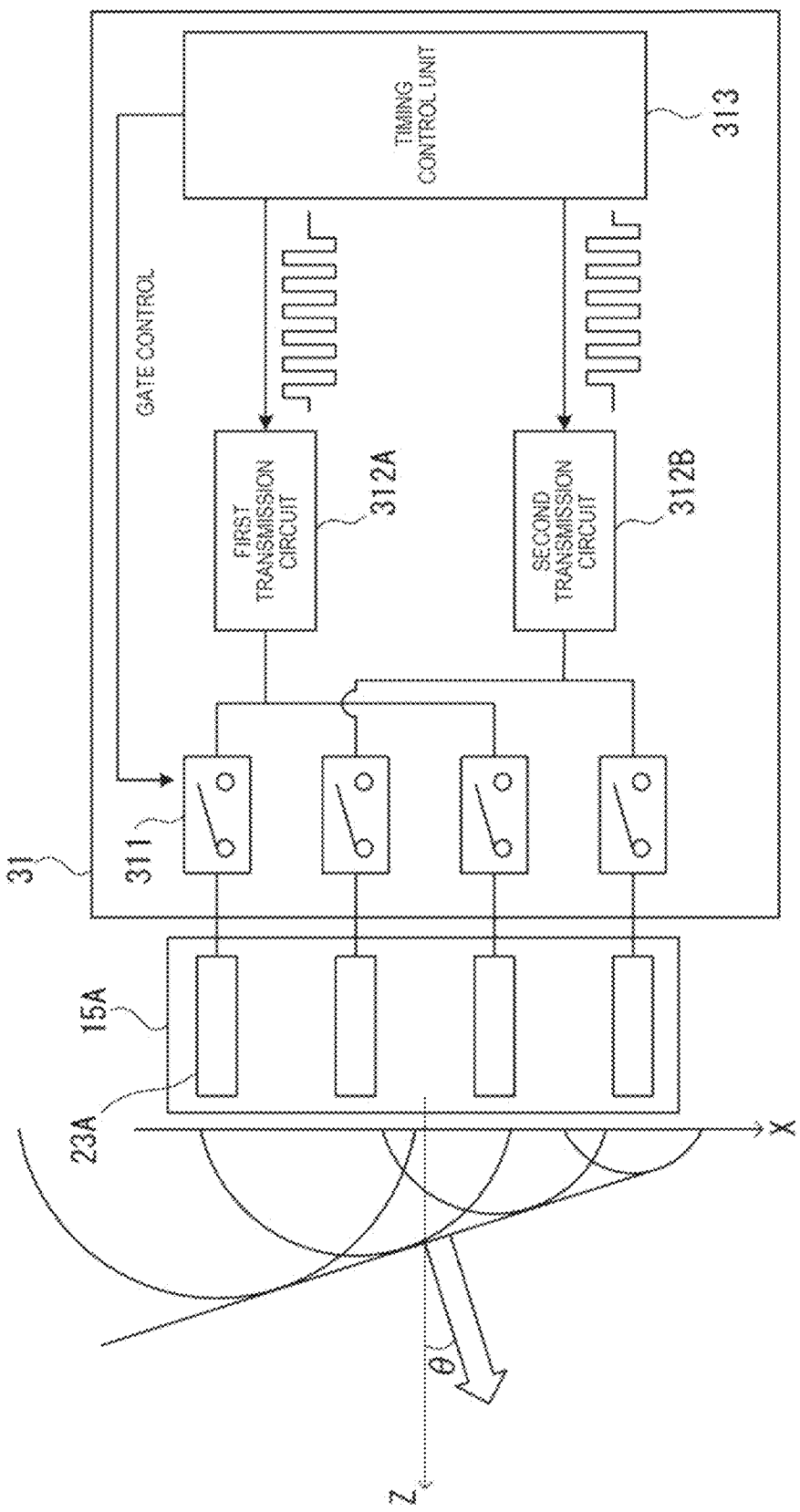
FIG. 10 is a diagram illustrating a schematic circuit configuration relating to the transmission unit, according to the first embodiment.
Figure 11:
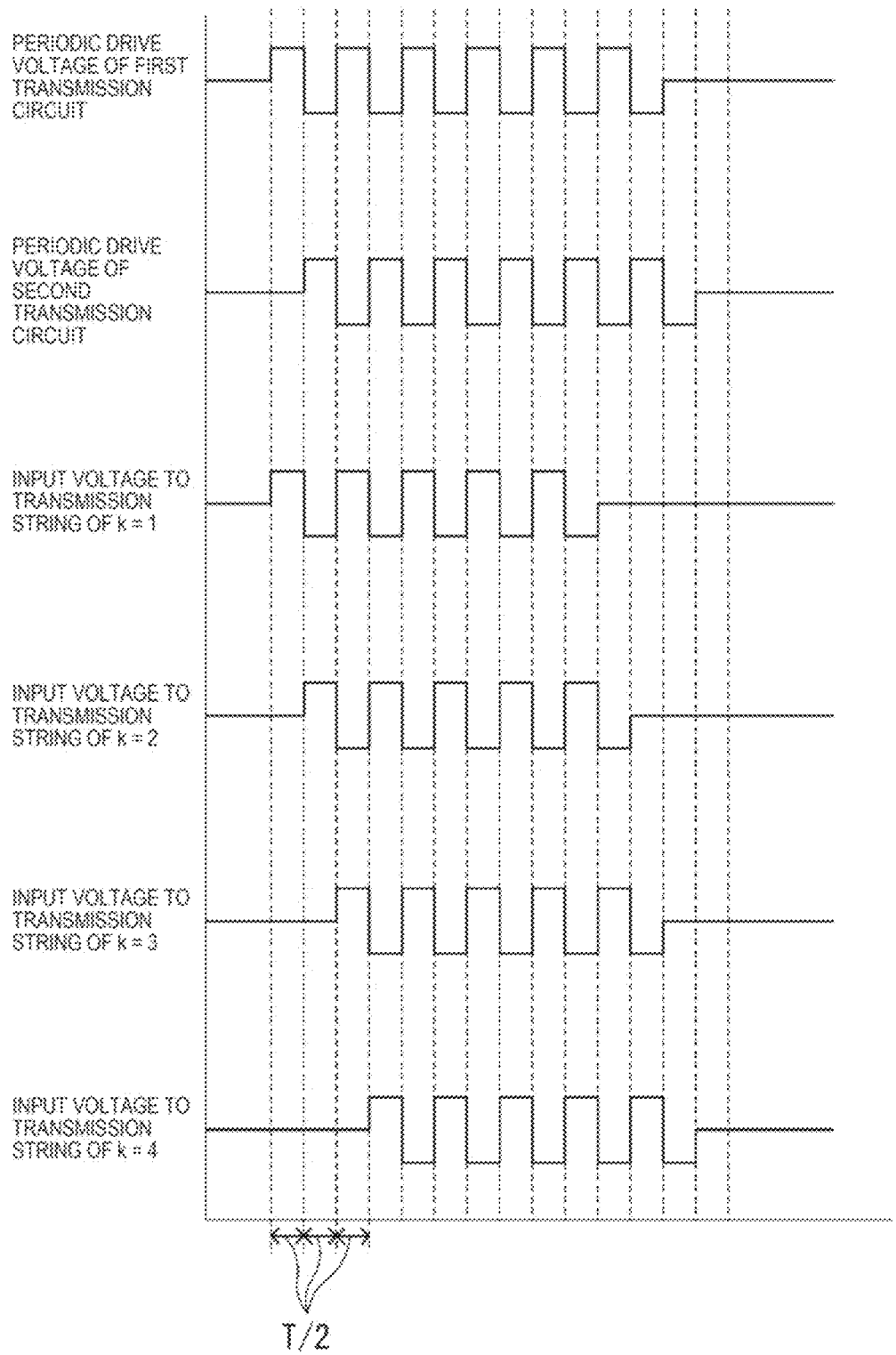
FIG. 11 is a timing chart of a periodic drive voltage generated by a first transmission circuit and a second transmission circuit, and a periodic drive voltage input to each transmission string, in the first embodiment.

FIG. 10 is a diagram schematically illustrating a circuit configuration relating to the transmission unit 15A, according to the present embodiment. In FIG. 10, the number of transmission strings 23A is set to four for the sake of brief description. FIG. 11 is a timing chart of periodic drive voltages generated by the first transmission circuit 312A and the second transmission circuit 312B, and input voltages (periodic drive voltages) input to the respective transmission strings 23A.

As illustrated in FIG. 3, the transmission unit 15A is connected to the transmission circuit substrate 31. As illustrated in FIG. 10, a switching element 311, a first transmission circuit 312A, a second transmission circuit 312B, and a timing control unit 313 are arranged on the transmission circuit substrate 31.

The switching element 311 is provided for each of the transmission strings 23A and connects the transmission string 23A to one of the first transmission circuit 312A and the second transmission circuit 312B. Specifically, the switching element 311 connected to the transmission string 23A disposed at a (2k−1)-th position (where k is a natural number equal to or larger than 1) from the −X side in the X direction is connected to the first transmission circuit 312A. In addition, the switching element 311 connected to the transmission string 23A disposed at a 2k-th position from the −X side in the X direction is connected to the second transmission circuit 312B. That is, in the present embodiment, the transmission strings 23A (transmission elements 23) disposed every other in the X direction are set as one transmission control group and can be connected to the corresponding one transmission circuit (the first transmission circuit 312A or the second transmission circuit 312B).

The switching elements 311 are switched between a connection position at which the transmission string 23A is connected to the transmission circuit (the first transmission circuit 312A or the second transmission circuit 312B) and a connection position at which the transmission string 23A is disconnected from the transmission circuit (the first transmission circuit 312A or the second transmission circuit 312B), under the control of the timing control unit 313.

The first transmission circuit 312A generates a periodic drive voltage which is input to the (2k+1)-th transmission string 23A. The second transmission circuit 312B generates a periodic drive voltage which is input to the 2k-th transmission string 23A. The first transmission circuit 312A and the second transmission circuit 312B are configured by a plus power supply, a minus power supply, a transistor with a high withstand voltage, and the like.

The first transmission circuit 312A and the second transmission circuit 312B generate periodic drive voltages of a predetermined cycle (cycle T), based on the control of the timing control unit 313. The periodic drive voltage generated by the second transmission circuit 312B is a periodic drive voltage whose phase is shifted (delayed) by half a cycle from the periodic drive voltage generated by the first transmission circuit 312A.

The timing control unit 313 configures a transmission control unit according to the invention and is configured by an integrated circuit such as a field-programmable gate array (FPGA).

The timing control unit 313 controls the first transmission circuit 312A and the second transmission circuit 312B. For example, the timing control unit 313 inputs a control signal instructing generation of the periodic drive voltage to the first transmission circuit 312A and the second transmission circuit 312B. The control signal includes a frequency (period) of the periodic drive voltage which is generated. Thereby, the first transmission circuit 312A and the second transmission circuit 312B generate the periodic drive voltage of a designated frequency.

At this time, as illustrated in FIG. 11, the timing control unit 313 outputs a first control signal for generating the periodic drive voltage of a predetermined cycle (for example, six cycles) to the first transmission circuit 312A. In addition, the timing control unit 313 outputs the first control signal to the second transmission circuit 312B and thereafter, delays the first control signal by a half cycle of the periodic drive voltage and outputs the first control signal for generating the periodic drive voltage of a predetermined cycle (for example, six cycles).

Thereby, as illustrated in FIG. 11, the periodic drive voltage having six waves is generated by the first transmission circuit 312A, and the periodic drive voltage having six waves delayed by a half cycle from the periodic drive voltage generated by the first transmission circuit 312A is generated by the second transmission circuit 312B.

In the example illustrated in FIG. 11, four transmission strings 23A are illustrated and the periodic drive voltage having five waves is input, and thereby, the first transmission circuit 312A and the second transmission circuit 312B generate the periodic drive voltages having six waves, and the number of waves of the periodic drive voltages generated by the first transmission circuit 312A and the second transmission circuit 312B can be appropriately adjusted depending on the number of transmission strings 23A and the frequency of the periodic drive voltage input to each transmission string 23A.

In addition, the timing control unit 313 performs a gate control of each switching element 311, thereby, switching a connection state of the switching element 311 between a connection position and a disconnection position.

In the present embodiment, since the reception unit 15B is disposed on the +X side with respect to the transmission unit 15A, the timing control unit 313 performs the gate control of each switching element 311 and switches to the connection position from the disconnection position, such that the periodic drive voltages are sequentially input from the transmission string 23A located at the −X side end portion in the X direction toward the +X side.

Specifically, after switching the switching element 311 corresponding to the i-th transmission string 23A from the −X side end portion to the connection position, the timing control unit 313 delays the periodic drive voltage by a half cycle and switches the switching element 311 corresponding to the (i+1)-th transmission string 23A to the connection position. After the switching element 311 is switched to the connecting position, the switching element 311 is switched to the disconnection position after a cycle of time corresponding to five cycles of the periodic drive voltage elapses.

Thereby, as illustrated in FIG. 11, the periodic drive voltage having one wave to the periodic drive voltage having five waves which are generated by the first transmission circuit 312A are input to the first transmission string 23A. The periodic drive voltage having one wave to the periodic drive voltage having five waves which are generated by the second transmission circuit 312B and delayed by a half cycle from the timing at which the periodic drive voltages are input to the first transmission string 23A, are input to the second transmission string 23A.

Furthermore, the periodic drive voltage having two waves and the periodic drive voltage having six waves, which are delayed by a half cycle from timing at which the periodic drive voltage is input to the second transmission string 23A and are generated by the first transmission circuit 312A, are input to the third transmission string 23A. In addition, the periodic drive voltage having two waves and the periodic drive voltage having six waves, which are delayed by a half cycle from timing at which the periodic drive voltage is input to the third transmission string 23A and are generated by the second transmission circuit 312B, are input to the fourth transmission string 23A.

That is, the periodic drive voltages input to the transmission strings 23A arranged at odd-numbered positions in the X direction have the same phase, and the periodic drive voltages generated by the first transmission circuit 312A can be input. Likewise, the periodic drive voltages input to the transmission strings 23A arranged at even-numbered positions in the X direction have the same phase, and the periodic drive voltages generated by the second transmission circuit 312B can be input. In this way, in the present embodiment, there is no need to provide the transmission circuits corresponding to each transmission string 23A and each transmission element 23, and the periodic drive voltage output from the same transmission circuit may be input to the transmission string 23A and the transmission element 23 belonging to the same transmission control group.

As illustrated in FIG. 10, the ultrasonic waves are transmitted by the above-described control in a direction according to the delay time.

Configuration of Reception Unit 15B

As illustrated in FIG. 3, the reception unit 15B is disposed such that the reception surface 15B1 directs the transmission unit 15A. That is, the reception unit 15B is disposed such that the reception surface 15B1 is perpendicular (or approximately perpendicular) to a sensor center axis 15C that connects the center of the reception unit 15B and the center of the transmission unit 15A.

The reception unit 15B can be configured by substantially the same configuration as the transmission unit 15A. That is, the reception unit 15B can be configured to include the element substrate 21 and the piezoelectric element 22 as illustrated in FIGS. 4 and 5. In this case, one reception element is configured by one vibration portion 212A and the piezoelectric element 22 on the vibration portion 212A. In the reception element, the vibration portion 212A receives the ultrasonic wave and vibrates, and thereby, the received signal is output from the piezoelectric element 22. Since the element substrate 21 and the piezoelectric element 22 that configure the reception element are the same as the transmission unit 15A, and description thereof will be omitted herein.

The ultrasonic sensor 15 according to the present embodiment detects multi-feed by measuring a sound pressure of the ultrasonic wave passing through the paper sheet P. Thus, the ultrasonic wave transmitted from the transmission unit 15A may be received by any one of the reception surfaces 15B1 of the reception unit 15B. In this case, a plurality of piezoelectric elements 22 arranged in the reception unit 15B may be connected in series, and a received signal obtained by adding the signal from the respective piezoelectric elements 22 may be output.

Each of the first electrode terminal and the second electrode terminal of the reception unit 15B is connected to the reception circuit substrate 32 fixing the reception unit 15B. The reception circuit substrate 32 is provided with a ground circuit for setting the second electrode terminal to a reference potential, a reception circuit for processing the received signal input from the first electrode terminal to output the received signal to the control unit 16, and the like. The reception circuit can use a general reception circuit that processes the received signal input by receiving the ultrasonic wave, and description thereof will be omitted herein.

Configuration of Control Unit 16

Figure 12:
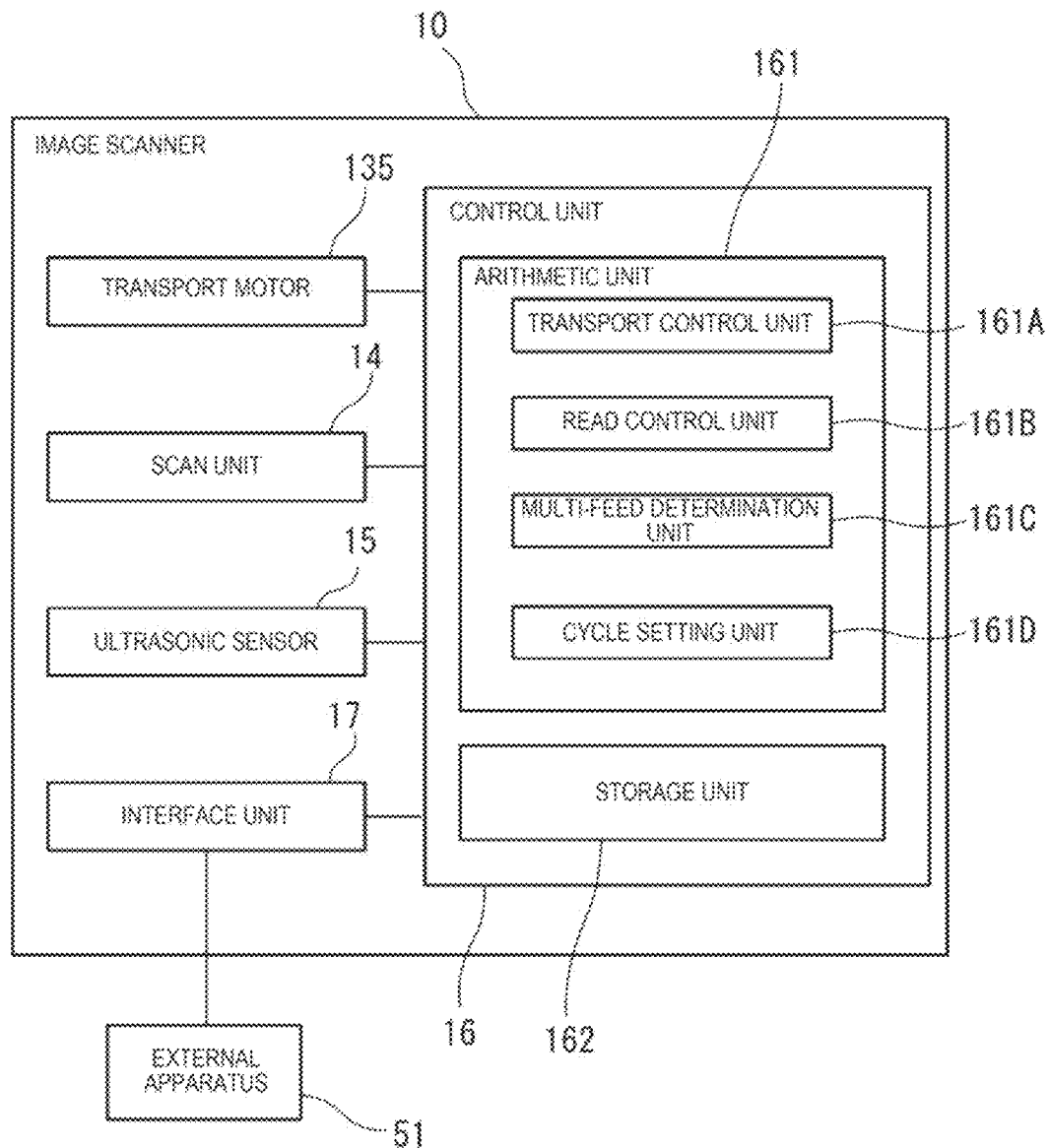
FIG. 12 is a block diagram illustrating a control configuration of the image scanner according to the first embodiment.

FIG. 12 is a block diagram illustrating a control configuration of the image scanner 10.

As illustrated in FIG. 12, the control unit 16 includes an arithmetic unit 161 configured by a central processing unit (CPU) and the like, and a storage unit 162 configured by a recording circuit such as a memory.

The control unit 16 is connected to the transport motor 135 of the transport portion 13, the scan unit 14, and the ultrasonic sensor 15 and controls drive of the transport motor 135, the scan unit 14, and the ultrasonic sensor 15. In addition, the control unit 16 is connected to an interface unit 17, and, for example, receives various types of data and various signals input from an external apparatus 51 such as a personal computer, or transmits read data read by the image scanner 10 to the external apparatus 51.

Various types of data for controlling the image scanner 10 and various programs are recorded in the storage unit 162.

As illustrated in FIG. 12, by reading and executing the various programs stored in the storage unit 162, the arithmetic unit 161 functions as a transport control unit 161A, a read control unit 161B, a multi-feed determination unit 161C, a cycle setting unit 161D, and the like.

The transport control unit 161A controls the transport motor 135 to rotate the plurality of roller pairs 131 to 134, and thereby, the plurality of sheets of paper sheet P set in the paper support 12 are fed to the main body 11 one by one. Furthermore, the transport control unit 161A transports the fed paper sheet P at a transport speed according to the reading conditions along the transport path 130.

The read control unit 161B controls the scan unit 14 and reads an image of the paper sheet P while the paper sheet P is transported.

The multi-feed determination unit 161C corresponds to the state detection unit according to the invention, controls the ultrasonic sensor 15, and determines the multi-feed of the paper sheet P based on the received signal input from the reception unit 15B.

Specifically, in a case where a voltage value of the received signal is smaller than a predetermined threshold, it is determined that the paper sheet P is fed in a multiple manner. In a case where it is determined that the multi-feed is performed by the multi-feed determination unit 161C, the transport control unit 161A stops transporting the paper sheet P.

In the ultrasonic sensor 15, the cycle setting unit 161D sets a cycle of a cycle drive voltage input to each transmission string 23A of the transmission unit 15A such that a transmission direction (sound axis) of the ultrasonic wave transmitted from the transmission unit 15A directs the reception unit 15B.

Method of Driving Ultrasonic Sensor 15

Cyclic Setting of Periodic Drive Voltage

Figure 13:
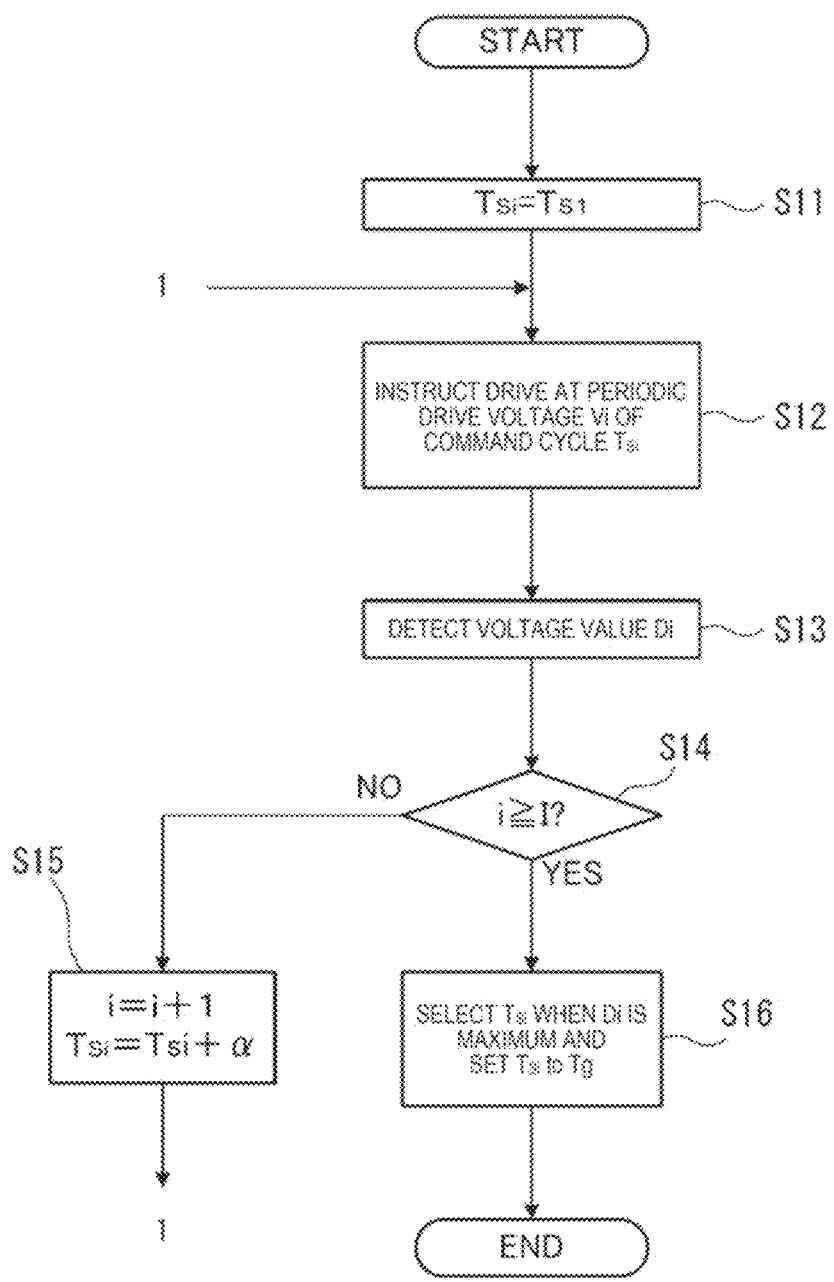
FIG. 13 is a flowchart illustrating a cycle setting method of the periodic drive voltage according to the first embodiment.

FIG. 13 is a flowchart illustrating a cycle setting method of the periodic drive voltage according to the present embodiment.

In the image scanner 10 according to the present embodiment, the sensor center axis 15C of the ultrasonic sensor 15 is inclined with respect to a normal line of the transport path 130. In this case, the periodic drive voltage input to each transmission string 23A of the transmission unit 15A needs to be set such that the sound axis of the ultrasonic wave transmitted from the transmission unit 15A coincides (or substantially coincides) with the sensor center axis 15C.

Cycle setting processing of the periodic drive voltage may be performed, for example, when the image scanner 10 is manufactured in a factory, may be performed when the image scanner 10 is started up, and may be periodically performed. It is preferable that the cycle setting processing is performed in a state in which the paper sheet P is not transported on the transport path 130, but may be performed in a state in which the paper sheet P is transported into the transport path 130.

In the cycle setting process, as illustrated in FIG. 13, the cycle setting unit 161D sets a cycle (command cycle $T_S$) of the periodic drive voltage at the time of driving the transmission unit 15A to a predetermined minimum cycle ($T_{S1}$) which is previously set (step S11).

Thereafter, the cycle setting unit 161D generates a command signal for instructing drive at the periodic drive voltage Vi of the set command cycle $T_{Si}$ and outputs the command signal to the ultrasonic sensor 15 (step S12). The suffix "i" is a variable indicating the number of measurements, the minimum value (initial value) is 1, and the maximum value is I. Shortly after step S11, a command signal for instructing drive of the minimum cycle $T_{S1}$ at the periodic drive voltage V1 is generated.

If the command signal is received, the timing control unit 313 of the transmission unit 15A causes the first transmission circuit 312A and the second transmission circuit 312B to generate the periodic drive voltage Vi of the set command cycle $T_{Si}$. In addition, the timing control unit 313 controls switching of each switching element 311, and sequentially inputs the periodic drive voltage from the transmission string 23A of the −X side end portion toward the +X side in a delay time of a 1/m cycle of the command cycle $T_{Si}$. In the present embodiment, since the periodic drive voltages are generated by the first transmission circuit 312A and the second transmission circuit 312B, m=2 and the periodic drive voltages are sequentially input in the delay time of a half cycle of the command cycle $T_{Si}$. Thereby, the ultrasonic waves are transmitted from the transmission unit 15A in a direction corresponding to a half cycle of the command cycle $T_{Si}$, and the reception unit 15B outputs the received signal corresponding to a sound pressure of the received ultrasonic wave to the control unit 16.

The cycle setting unit 161D detects a voltage value Di of the received signal output from the reception unit 15B (step S13). In addition, the cycle setting unit 161D stores the read voltage value Di in a primary storage area such as a memory in association with the command cycle $T_{Si}$.

Next, the cycle setting unit 161D determines whether or not the command cycle $T_{Si}$ is a predetermined maximum cycle, that is, whether or not a variable i is the maximum value I (step S14).

In a case where it is determined that the answer is No in step S14 (in a case where the variable i is not the maximum value I), the cycle setting unit 161D adds 1 to the variable i, increases a value of the command cycle $T_{Si}$ by a predetermined value α (step S15), and returns to step S12.

Figure 14:
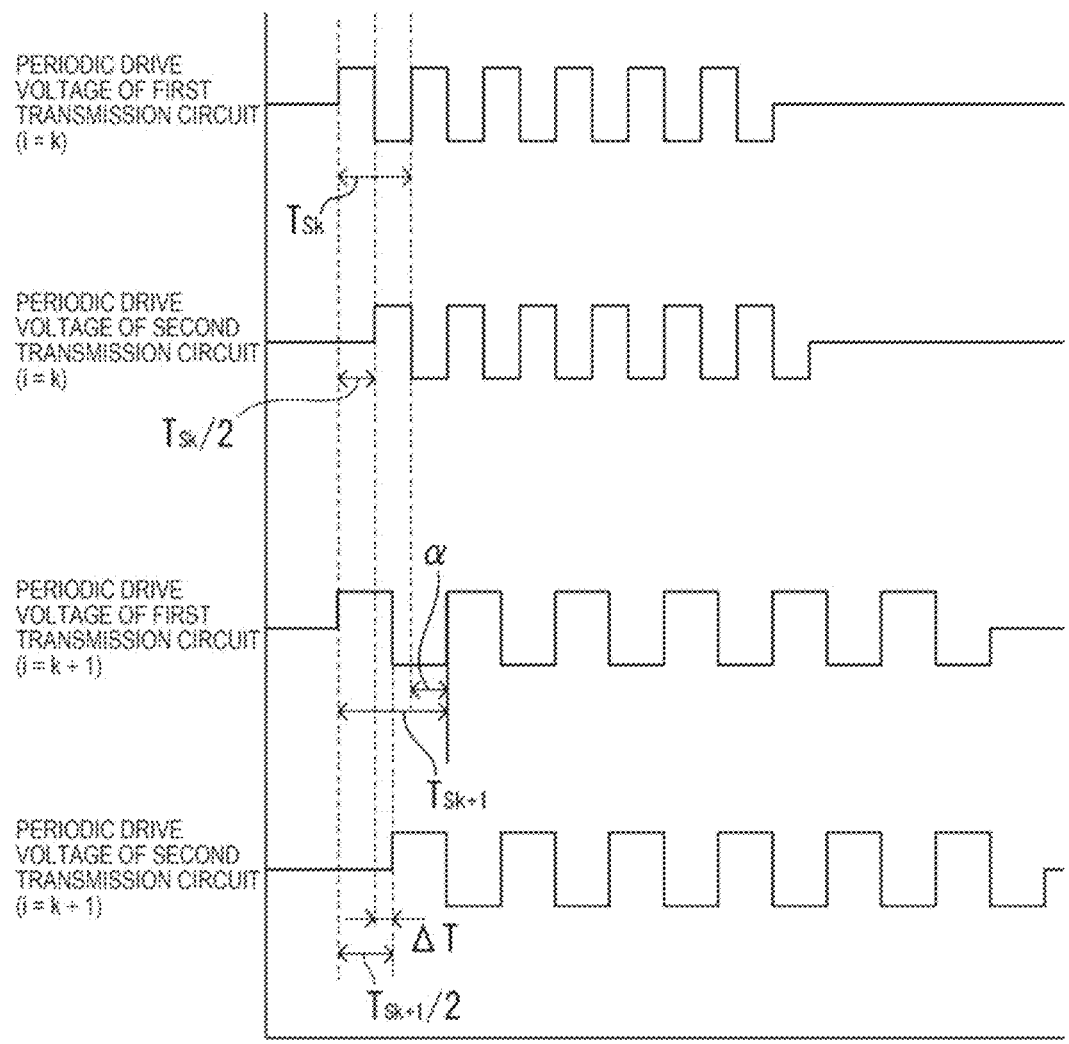
FIG. 14 is a diagram illustrating a method of changing a cycle in the first embodiment.

FIG. 14 is a diagram illustrating a method of changing the cycle according to the present embodiment.

In a case where the step S12 is performed after the value of the command cycle $T_{Si}$ is increased by the cycle setting unit 161D in step S15, cycles of the periodic drive voltages generated by each of the first transmission circuit 312A and the second transmission circuit 312B are changed. At this time, in the present embodiment, as illustrated in FIG. 14, the first transmission circuit 312A and the second transmission circuit 312B maintain a duty ratio of the periodic drive voltage (pulse wave), and generate the periodic drive voltages obtained by increasing a high level cycle and a low level cycle by the same proportion. Thereby, as illustrated in FIG. 14, the delay time at the time of delay-driving each transmission string 23A increases by ΔT, and a transmission direction of the ultrasonic wave changes by an angle corresponding to ΔT.

The cycle setting unit 161D loops the processing from step S12 to step S15 until it is determined that the answer is Yes in step S14 and increases the value of the command cycle $T_{Si}$ from the minimum cycle $T_{S1}$ to the maximum cycle $T_{SI}$ by the predetermined value α. Thereby, the transmission direction of the ultrasonic wave output from the transmission unit 15A gradually changes from the −X side to the +X side (an angle formed by the sound axis of the ultrasonic wave and the normal line of the transmission surface 15A1 gradually increases). The processing from step S12 to step S15 corresponds to a voltage detection step according to the invention.

In a case where it is determined that the answer is Yes in step S14, the cycle setting unit 161D selects the command cycle $T_{Si}$ when a voltage value Di of the received signal becomes the maximum with reference to the measurement result of the voltage value Di of the received signal with respect to the command cycle $T_{Si}$, and set the selected command cycle to a setting cycle Tg (step S16). This step S16 corresponds to a cycle setting step according to the invention.

In addition, the cycle setting unit 161D stores the setting cycle Tg in the storage unit 162 or a storage circuit (memory or the like) provided in the transmission circuit substrate 31 of the transmission unit 15A.

Multi-feed detection When Transporting Paper Sheet

Next, in the image scanner 10 according to the present embodiment, the multi-feed detection processing performed by the ultrasonic sensor 15 when transporting the paper sheet P will be described.

Figure 15:
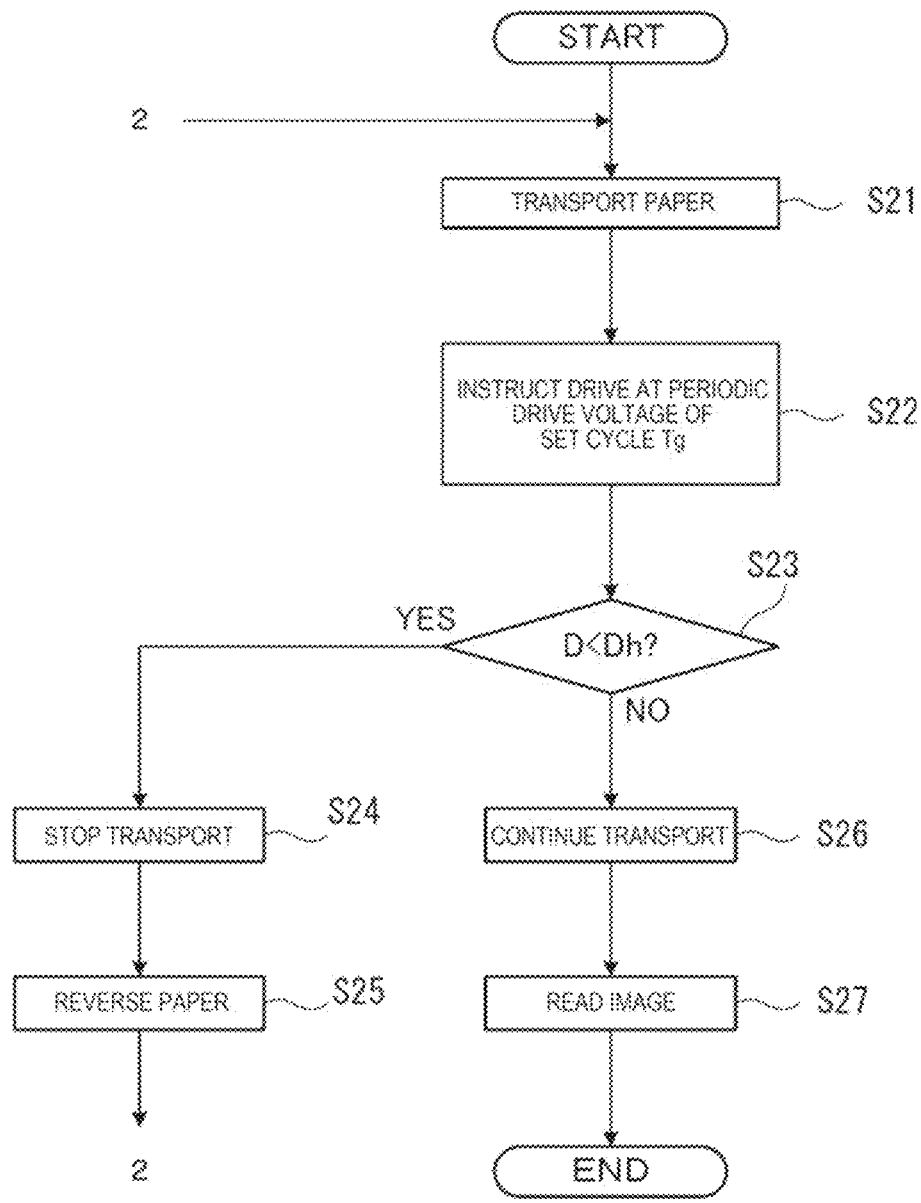
FIG. 15 is a flowchart illustrating a paper scanning method including multi-feed detection processing according to the first embodiment.

FIG. 15 is a flowchart illustrating a method of scanning the paper sheet P including the multi-feed detection processing.

In the image scanner 10, when reading an image of the paper sheet P, the transport control unit 161A drives the transport motor 135 and the plurality of sheets of paper sheet P are transported by the transport portion 13 one by one (step S21).

The multi-feed determination unit 161C drives the ultrasonic sensor 15 using the periodic drive voltage of the setting cycle Tg set in step S16 (step S22).

Here, as described above, the periodic drive voltages of the setting cycle Tg are sequentially input to each transmission string 23A aligned in the X direction from the −X side to the +X side at a half cycle of the setting cycle Tg, and the setting cycle Tg is set such that the received signal output from the reception unit 15B becomes the maximum when the ultrasonic waves are transmitted from the transmission unit 15A. Accordingly, even if an attachment angle error is included when the transmission unit 15A and the reception unit 15B is attached to the main body 11, the timing control unit 313 can make the sound axis of the ultrasonic wave transmitted from the transmission unit 15A coincide or substantially coincide with the sensor center axis 15C by driving the transmission unit 15A under a delay control based on the periodic drive voltage of the setting cycle Tg.

The multi-feed determination unit 161C determines whether or not the voltage value D of the received signal output from the reception unit 15B of the ultrasonic sensor 15 is smaller than a threshold Dh (step S23; state detection step).

In a case where it is determined that the answer is Yes in step S23, that is, in a case where a voltage value of the received signal is smaller than the threshold, a sound pressure of the ultrasonic wave passing through the paper sheet P is reduced, and it is determined that two or more sheets of the paper are in a state (multi-feed) in which the paper sheet is transported. In this case, the transport control unit 161A stops a transport operation of the paper sheet P (step S24). In this case, the transport control unit 161A reverses the transport direction of the paper sheet P, returns the paper sheet P in the transport path 130 to an upstream side (−Y side) of the second feed roller pair 132 including the retard roller (step S25), and returns to the processing of step S21. An error message or the like may be displayed to end the processing.

In a case where it is determined that the answer is No in step S23, that is, in a case where a voltage value of the received signal is equal to or greater than a threshold, the transport control unit 161A continuously perform a transport operation of the paper sheet P (step S26). If the transported paper sheet P reaches a read position, the read control unit 161B controls the scan unit 14 to read an image (step S27). Thereafter, the paper sheet P is further transported by the transport control unit 161A, and thereby, the paper sheet P is discharged from the discharge hole 11B.

Operation Effect of Present Embodiment

The ultrasonic sensor 15 according to the present embodiment includes the transmission unit 15A which is disposed on the sensor center axis 15C (first axis) inclined with respect to a normal line of a surface of the paper sheet P (object) and transmits an ultrasonic wave toward the paper sheet P, and a reception unit 15B provided on a side opposite to the transmission unit 15A for the paper sheet P on the sensor center axis 15C. In addition, the transmission unit 15A is connected to the transmission circuit substrate 31, and the transmission circuit substrate is provided with the timing control unit 313 (transmission control unit) that controls drive of the transmission unit 15A. The timing control unit 313 delay-drives each transmission string 23A to adjust a direction of the ultrasonic wave transmitted from the transmission unit 15A to the sensor center axis 15C.

Accordingly, When the transmission unit 15A and the reception unit 15B are mounted on the main body 11 of the image scanner 10, even in a case where an attachment angle error is included and a sound axis of the transmission unit 15A is deviated from the sensor center axis 15C, it is possible to finely adjust a transmission direction of the ultrasonic wave from the transmission unit 15A. Thus, it is possible to suppress decrease of a voltage of the received signal when the ultrasonic wave is received by the reception unit 15B, and to detect multi-feed of the paper sheet P with a high accuracy, based on the received signal output from the reception unit 15B.

In the ultrasonic sensor 15 according to the present embodiment, the transmission element pitch d (arrangement interval) between the plurality of transmission elements 23 of the transmission unit 15A is one to two times the wavelength $\lambda$ of the ultrasonic wave output from the transmission element 23. That is, the transmission element pitch d is $dg<d\leq 2$ dg, in a case where the maximum transmission element pitch d at which grating lobe is not generated is set to dg ($=\lambda$).

The ultrasonic sensor 15 according to the present embodiment detects the multi-feed by passing through the paper sheet P, and a distance from the transmission unit 15A to the reception unit 15B is approximately 20 mm. In this case, by being set to $dg<d\leq 2$ dg, a transmission direction of the ultrasonic wave can be controlled with a high accuracy, and an arrival position of the ultrasonic wave can be changed in the X direction with respect to a position at a distance (depth) of approximately 20 mm in the Z direction from the transmission unit 15A. In addition to this, generation of the grating lobe at the depth is almost zero, and a decrease in accuracy due to the grating lobe is also negligible.

In addition, in a case where the transmission element 23 is disposed at the transmission element pitch d satisfying $d<dg$ with respect to the transmission surface 15A1 of the transmission unit 15A, a wiring configuration in the transmission unit 15A is complicated, and resistance of each wire also increases. In contrast to this, in a case where the transmission element pitch d is set to $dg<d\leq 2$ dg, the wiring configurations in the transmission unit 15A and the transmission circuit substrate 31 can also be simplified, and since a wiring thickness in the transmission unit 15A can also be secured, a wiring resistance can also be reduced.

The ultrasonic sensor 15 according to the present embodiment includes the first transmission circuit 312A that generates a periodic drive voltage for a transmission control group to which the odd-numbered transmission strings 23A in the X direction belong, and the second transmission circuit 312B that generates a periodic drive voltage for a transmission control group to which the even-numbered transmission strings 23A in the X direction belong. In addition, the switching elements 311 are provided in each transmission string 23A, respectively. Then, the timing control unit 313 sequentially switches the switching elements 311 to the connection position from the switching element 311 corresponding to the transmission string 23A located at the −X side end portion toward the +X side, in a half cycle of the periodic drive voltage.

Thereby, the periodic drive voltages delayed by a half cycle are sequentially input to the respective transmission strings 23A arranged in the X direction, and the ultrasonic waves can be transmitted from the transmission unit 15A in a direction corresponding to the delay time.

In such a configuration, even if the number of transmission strings 23A is three or more, delay-driving each transmission string 23A can be performed by the two transmission circuits of the first transmission circuit 312A and the second transmission circuit 312B. Thus, the circuit configuration can be simplified and a cost of the ultrasonic sensor 15 can be reduced as compared with, for example, a case where a transmission circuit is provided for each transmission string 23A.

In the ultrasonic sensor 15 according to the present embodiment as described above, the timing control unit 313 outputs a control signal including a command cycle or a setting cycle to the first transmission circuit 312A and the second transmission circuit 312B and changes a cycle of the periodic drive voltage generated by the first transmission circuit 312A and the second transmission circuit 312B.

In the present embodiment, the periodic drive voltages are delayed by a half cycle and are sequentially input to the respective transmission strings 23A sequentially arranged in the X direction. In the present embodiment, in order to change the transmission direction of the ultrasonic wave by changing the delay time, a cycle of the periodic drive voltage needs to be changed. In the present embodiment, as described above, the timing control unit 313 can output the control signal to the first transmission circuit 312A and the second transmission circuit 312B to change the cycle of the periodic drive voltage, and thereby, it is possible to change the transmission direction of the ultrasonic wave to a desirable direction.

The image scanner 10 according to the present embodiment includes the multi-feed determination unit 161C that detects multi-feed of the paper sheet P, based on a voltage value of a received signal output from the reception unit 15B of the ultrasonic sensor 15.

As described above, even if an attachment angle error occurs when the transmission unit 15A and the reception unit 15B are attached to the main body 11, the ultrasonic sensor 15 can adjust a transmission direction of the ultrasonic wave transmitted from the transmission unit 15A so as to coincide with the sensor center axis 15C. Thus, the reception unit 15B can suitably receive the ultrasonic wave which is transmitted from the transmission unit 15A and passes through the paper sheet P. Thus, the multi-feed determination unit 161C can accurately detect the multi-feed of the paper sheet P, based on the received signal output from the reception unit 15B.

In the present embodiment, the cycle setting unit 161D sequentially inputs the periodic drive voltages to the plurality of transmission elements 23 (the transmission strings 23A) aligned in the X direction with a delay time of a half cycle of the periodic drive voltage, and performs the voltage detection step (step S12 to step S15) for detecting the voltage of the received signal output when the reception unit 15B receives the ultrasonic waves. At this time, the cycle setting unit 161D changes a cycle of the periodic drive voltage by a predetermined value α, and detects a voltage of the received signal with respect to each periodic drive voltage whose cycle is changed. Then, the cycle setting unit 161D sets a cycle at which the received signal detected at the voltage detection step becomes maximum as a setting cycle.

Thereby, even in a case where an attachment angle error occurs when the transmission unit 15A and the reception unit 15B are attached to the main body 11, a transmission direction (sound axis) of the ultrasonic wave transmitted from the transmission unit 15A can coincide with the sensor center axis 15C. Thereby, it is possible to perform a highly accurate multi-feed detection by using the ultrasonic sensor 15.

Second Embodiment

The first embodiment described above exemplifies a configuration including the first transmission circuit 312A that generates periodic drive voltages which are input to the odd-numbered transmission strings 23A in the X direction, and the second transmission circuit 312B that generates periodic drive voltages which are input to the even-numbered transmission strings 23A.

In contrast to this, the second embodiment is different from the first embodiment in that the periodic drive voltages input to the respective transmission strings 23A are generated by one transmission circuit. In the following description, the same reference numerals or symbols are given to the previously described components, and description thereof will be omitted or simplified.

Figure 16:
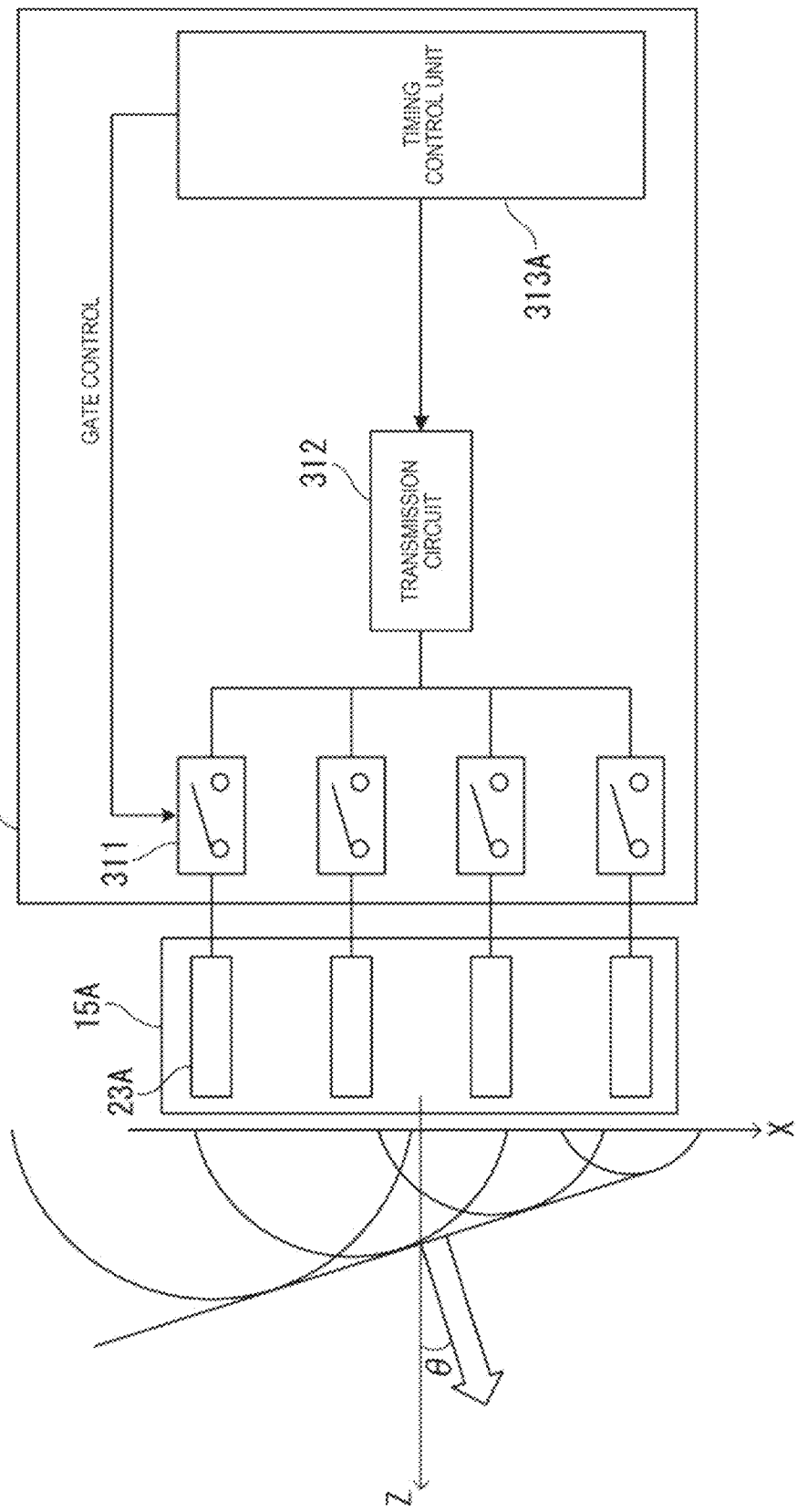
FIG. 16 is a diagram illustrating a schematic circuit configuration relating to a transmission unit, according to a second embodiment.
Figure 17:
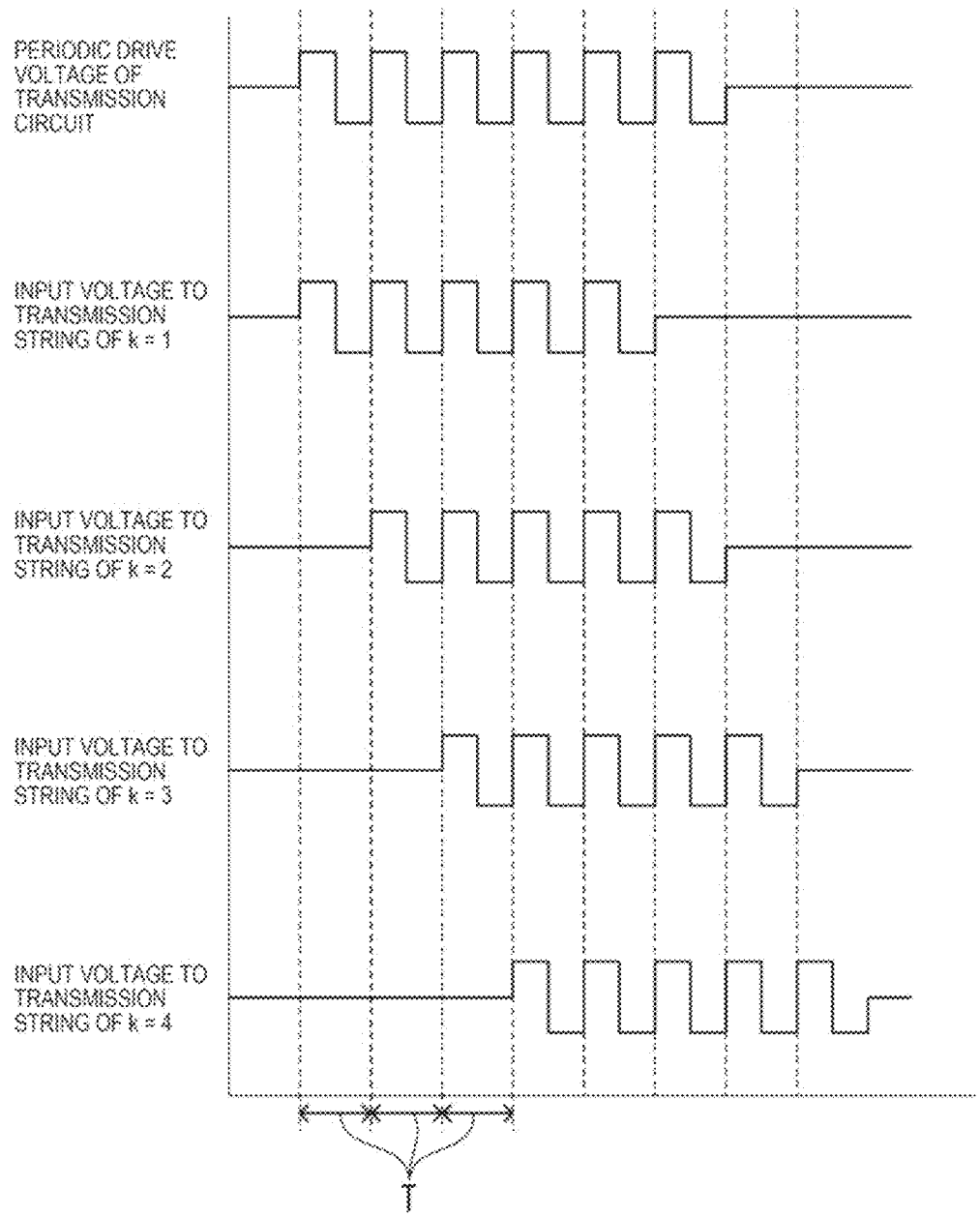
FIG. 17 is a timing chart of a periodic drive voltage generated by a first transmission circuit and a second transmission circuit, and periodic drive voltages input to each transmission string in the second embodiment.

FIG. 16 is a diagram illustrating a circuit configuration relating to a transmission unit 15A, according to the second embodiment. FIG. 17 is a timing chart of the periodic drive voltage generated by the transmission circuit 312 and the periodic drive voltages input to the respective transmission strings 23A, in the second embodiment.

As illustrated in FIG. 16, the transmission circuit substrate 31A according to the present embodiment includes the switching elements 311, a transmission circuit 312, and a timing control unit 313A.

In the same manner as in the first embodiment, the switching elements 311 are provided corresponding to the respective transmission strings 23A, respectively. The switching element 311 can be switched between a connection position for connecting the transmission string 23A to the transmission circuit 312 and a disconnection position for disconnecting the transmission string 23A from the transmission circuit 312, under a gate control made by the timing control unit 313A.

In addition, the respective switching elements 311 are connected to one transmission circuit 312. As in the first embodiment, the transmission circuit 312 generates a periodic drive voltage of a command cycle or a setting cycle, based on a control signal from the timing control unit 313A.

As illustrated in FIG. 17, when the ultrasonic wave is transmitted from the transmission unit 15A, the timing control unit 313A according to the present embodiment delays switching of the respective switching elements 311 to the connection positions by integer multiple (for example, one time) of a cycle of the periodic drive voltage. That is, after the switching element 311 corresponding to the transmission string 23A disposed in the −X side end portion is switched to a connection position, and a delay time corresponding to one cycle of the periodic drive voltage elapsed, and thereafter, the switching element 311 corresponding to the transmission string 23A disposed at a second position from the −X side is switched to the connection position. Thereafter, a delay time corresponding to one cycle of the periodic drive voltage is provided, and the periodic drive voltages are sequentially input to the transmission string 23A on the +X side.

Even by such a configuration, a plurality of transmission strings 23A aligned in the X direction are sequentially delay-driven from the −X side to the +X side, and thereby, a transmission direction of the ultrasonic wave can be directed to the +X side with respect to a normal line of the transmission surface 15A1.

Operation Effect of Present Embodiment

The ultrasonic sensor 15 according to the present embodiment includes one transmission circuit 312 that generates a periodic drive voltage and the switching elements 311 provided for each of the plurality of transmission strings 23A. The timing control unit 313A sequentially switches the switching element 311 corresponding to the transmission string 23A arranged in −X direction from a disconnection position to the connection position with a delay time corresponding to one cycle of the periodic drive voltage.

Also in the present embodiment, the respective transmission strings 23A arranged in the X direction can be delayed and driven sequentially, and the ultrasonic waves are transmitted from the transmission unit 15A in a direction according to the delay time, in the same manner as in the first embodiment.

In addition, in the present embodiment, since only one transmission circuit 312 may be provided, the circuit configuration can be further simplified than the circuit configuration according to the first embodiment, and a cost of the ultrasonic sensor 15 can be reduced.

Third Embodiment

The first embodiment and the second embodiment exemplify a configuration in which the switching elements 311 corresponding to the respective transmission strings 23A are provided, but the third embodiment is different from the first embodiment and the second embodiment in that a multiplexer is used instead of the switching elements 311.

Figure 18:
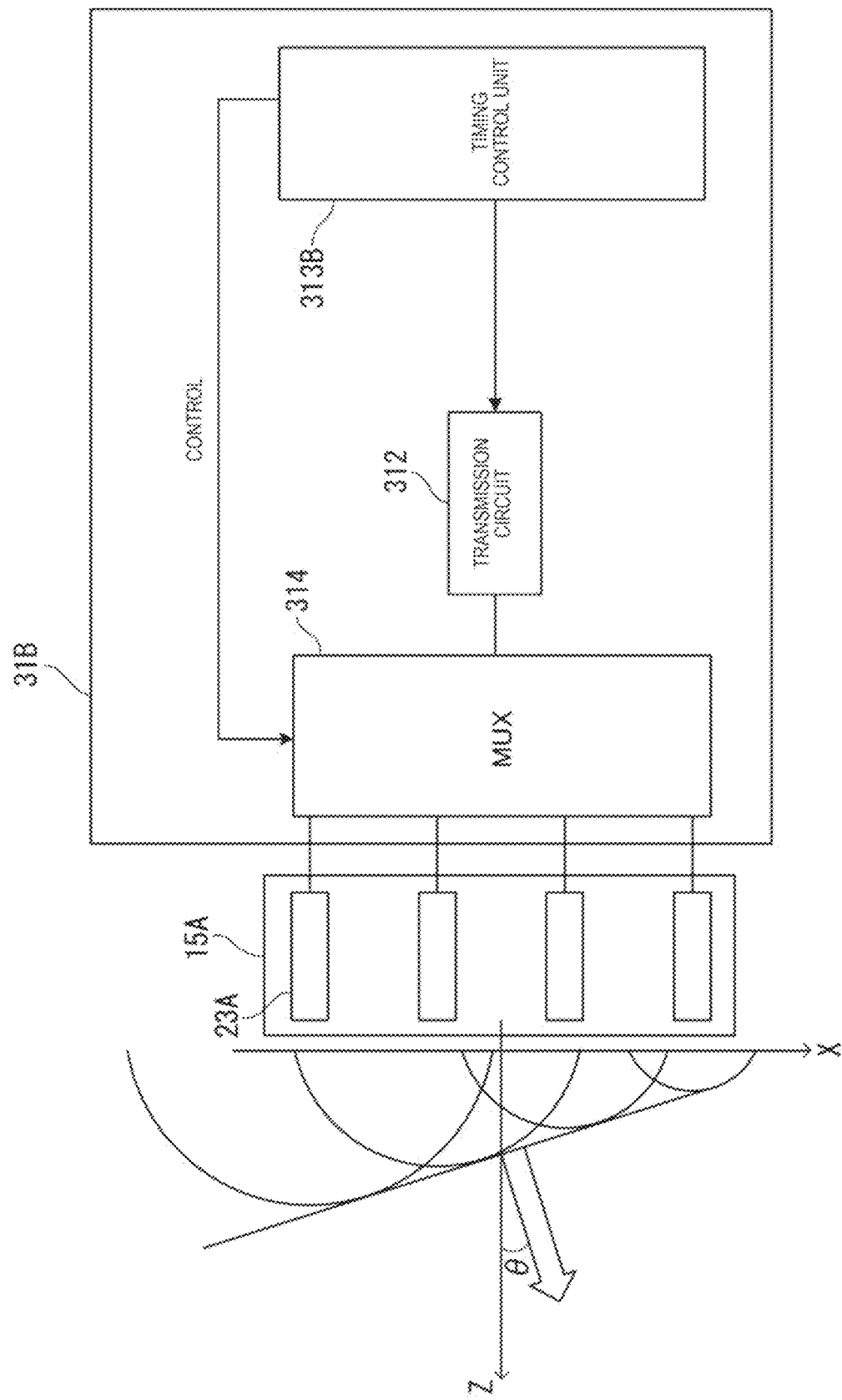
FIG. 18 is a diagram illustrating a schematic circuit configuration relating to a transmission unit, according to a third embodiment.
Figure 19:
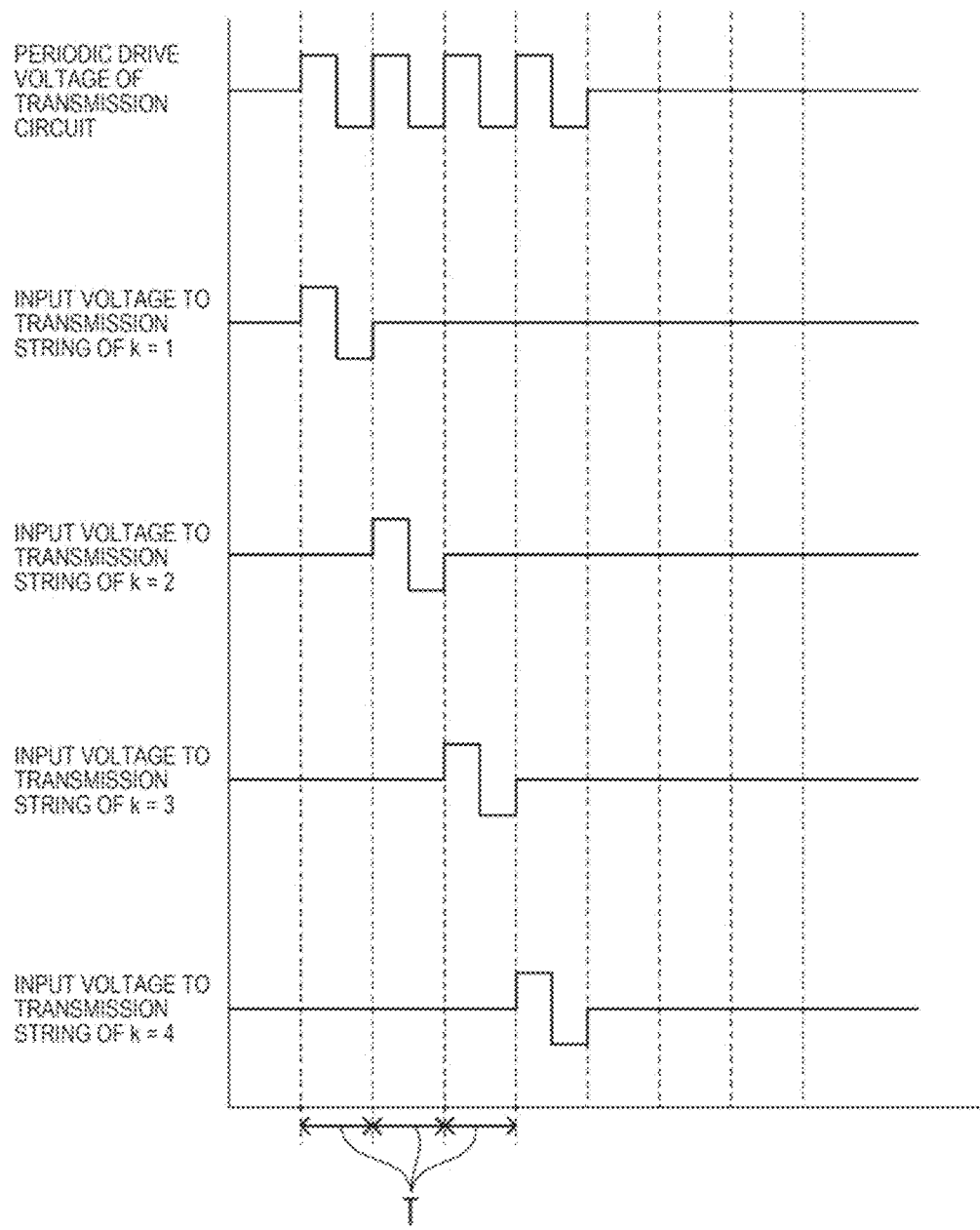
FIG. 19 is a timing chart of a periodic drive voltage generated by a first transmission circuit and a second transmission circuit, and a periodic drive voltage input to each transmission string in the third embodiment.

FIG. 18 is a diagram illustrating a circuit configuration relating to the transmission unit 15A, according to the third embodiment. FIG. 19 is a timing chart of the periodic drive voltage generated by the transmission circuit 312 and the periodic drive voltages input to the respective transmission strings 23A, in the third embodiment.

As illustrated in FIG. 18, the transmission circuit substrate 31B according to the present embodiment includes a multiplexer 314, a transmission circuit 312, and a timing control unit 313B.

The multiplexer 314 is connected to the respective transmission strings 23A and the transmission circuit 312, and outputs the periodic drive voltage input from the transmission circuit 312 to one of the plurality of transmission strings 23A.

The transmission circuit 312 has the same configuration as in the second embodiment.

When the ultrasonic wave is transmitted from the transmission unit 15A, the timing control unit 313B according to the present embodiment controls the multiplexer 314, and as illustrated in FIG. 19, the timing control unit 313B switches an output destination of the periodic drive voltage input from the transmission circuit 312 from the transmission string 23A on the −X side to the transmission string 23A on the +X side at the timing of an integer multiple (for example, 1 time) of a cycle of the periodic drive voltage.

That is, the respective transmission strings 23A from the transmission string 23A disposed on the −X side end portion to the transmission string 23A disposed on the +X side end portion are sequentially driven with a delay time corresponding to one cycle of the periodic drive voltage. In this case, the periodic drive voltage input to each transmission string 23A is a pulse wave of one cycle.

Even with such a configuration, the plurality of transmission strings 23A aligned in the X direction are delay-driven sequentially from the −X side to the +X side, and thereby, a transmission direction of the ultrasonic wave can be directed to the +X side with respect to a normal line of the transmission surface 15A1.

Operation Effect of Present Embodiment

The ultrasonic sensor 15 according to the present embodiment includes one transmission circuit 312 that generates a periodic drive voltage, and the multiplexer 314 connected to the plurality of transmission strings 23A and the transmission circuit 312. The timing control unit 313B sequentially switches the transmission strings 23A that output the periodic drive voltage from the multiplexer 314 in the X direction with a delay time corresponding to one cycle of the periodic drive voltage.

Also in the present embodiment, in the same manner as in the first embodiment and the second embodiment, it is possible to sequentially delay-drive the respective transmission strings 23A aligned in the X direction, and to transmit the ultrasonic wave from the transmission unit 15A in the direction corresponding to the delay time.

In addition, in the same manner as in the second embodiment, since only one transmission circuit 312 may be provided, a circuit configuration can be further simplified as compared with the circuit configuration according to the first embodiment, and a cost of the ultrasonic sensor 15 can be reduced.

Modification Example

The invention is not limited to the respective embodiments and the modification example described above, and modification and improvement within a range in which an object of the invention can be attained, a configuration obtained by appropriately combining the respective embodiments, and the like are included in the invention.

For example, the first embodiment described above provides an example in which, when the command cycle is increased in step S15 and step S12 is implemented, the first transmission circuit 312A and the second transmission circuit 312B maintain a duty ratio of the periodic drive voltage, and a high level cycle and a low level cycle are increased by the same proportion. In contrast to this, a D/D ratio of the periodic drive voltage may be changed.

Figure 20:
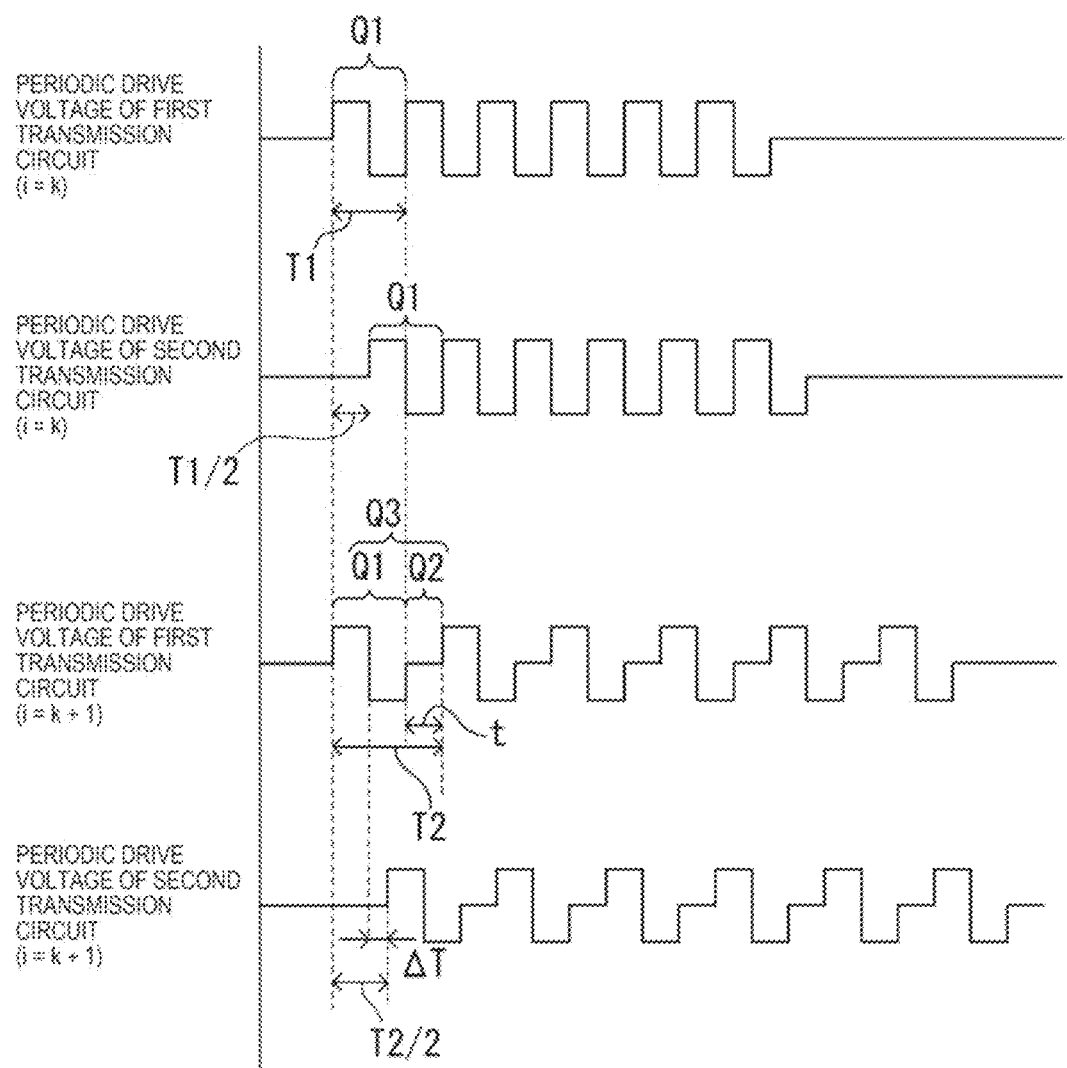
FIG. 20 is a diagram illustrating a method of changing a cycle of a periodic drive voltage according to a modification example.

FIG. 20 is a diagram illustrating an example of another method of changing the cycle of the periodic drive voltage.

For example, as illustrated in FIG. 20, the first transmission circuit 312A and the second transmission circuit 312B may change the duty ratio by inserting a delay time Δt into a reference periodic voltage Q. Specifically, the first transmission circuit 312A and the second transmission circuit 312B generate the reference periodic voltage Q as illustrated in FIG. 20 in a case where the command cycle is the minimum cycle. The reference cycle voltage Q has a pulse waveform in which a reference waveform portion Q1 having a high level signal with a pulse width of a half cycle (T½) and a low level signal with a pulse width of a half cycle (T½).

If the command cycle T2 is increased by the cycle setting unit 161D, the first transmission circuit 312A and the second transmission circuit 312B calculate a standby time t obtained by subtracting the reference cycle T1 from the command cycle T2. Then, the first transmission circuit 312A and the second transmission circuit 312B add a reference level waveform portion Q2 to the reference waveform portion Q1 in the standby time t to set a periodic voltage waveform Q3 of one cycle, and generates a periodic drive voltage in which the periodic voltage waveforms Q3 are continuously repeated. That is, in the present example, a pulse width of the high level signal does not vary, but the duty ratio varies because the cycle changes.

Even in such a case, as illustrated in FIG. 20, the delay time ΔT at the time of delay-driving the respective transmission strings 23A increases by a standby time t/2 as compared with the time when the transmission unit 15A is driven by using the periodic drive voltage of a minimum cycle, and a transmission direction of the ultrasonic wave changes by an angle corresponding to the standby time t/2.

In addition, FIG. 20 illustrates an example in which a plurality of transmission circuits are provided as in the first embodiment, but the cycle of the periodic drive voltage can be adjusted in the same manner even in a configuration in which only one transmission circuit 312 is provided, as in the second embodiment and the third embodiment.

That is, even in a case where only one transmission circuit 312 is provided, the reference level waveform portion Q2, which is a difference between a reference cycle T1 and a command cycle T2, in the standby time t is added to the reference waveform portion Q1 to form the periodic voltage waveform Q3 of one cycle, and the periodic drive voltage in which the periodic voltage waveform Q3 is continuously repeated may be generated, in the same manner as above.

In the first embodiment described above, the transmission strings 23A (transmission elements 23) arranged every other in the X direction are defined as one transmission control group.

In contrast to this, the transmission strings 23A arranged every n number may be set as one transmission control group. That is, the transmission control group is divided into a total n+1 transmission control groups that include a transmission control group including a {(n+1)k−n}-th (k is a natural number equal to or larger than 1) transmission string 23A, a transmission control group including a {(n+

1)k−(n−1)}-th transmission string 23A, . . . , a transmission control group including a {(n+1)k+1}-th transmission string 23A and {(n+1)k}-th transmission string 23A from the −X side in the X direction. In this case, n+1 transmission circuits corresponding to the respective transmission control group are provided, and the periodic drive voltages delayed by a h/(n+1) cycle (h is a positive integer) are sequentially generated. That is, the k-th transmission circuit corresponding to the k-th transmission control group in the X direction generates the periodic drive voltage delayed by an integer multiple of h/(n+1) with respect to the periodic drive voltage generated by the (k−1)-th transmission circuit.

Figure 21:
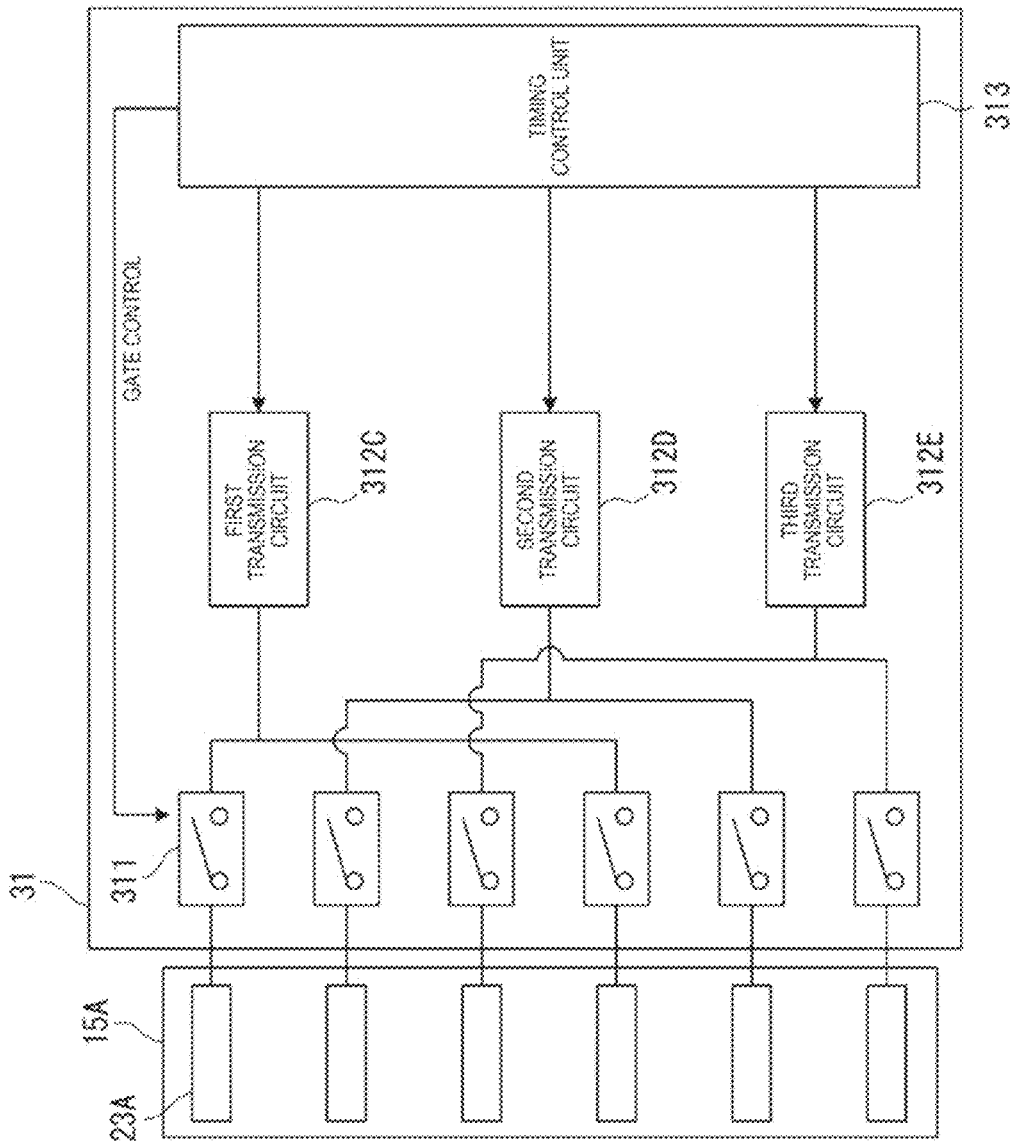
FIG. 21 is a diagram illustrating a circuit configuration of an ultrasonic sensor according to the modification example.
Figure 22:
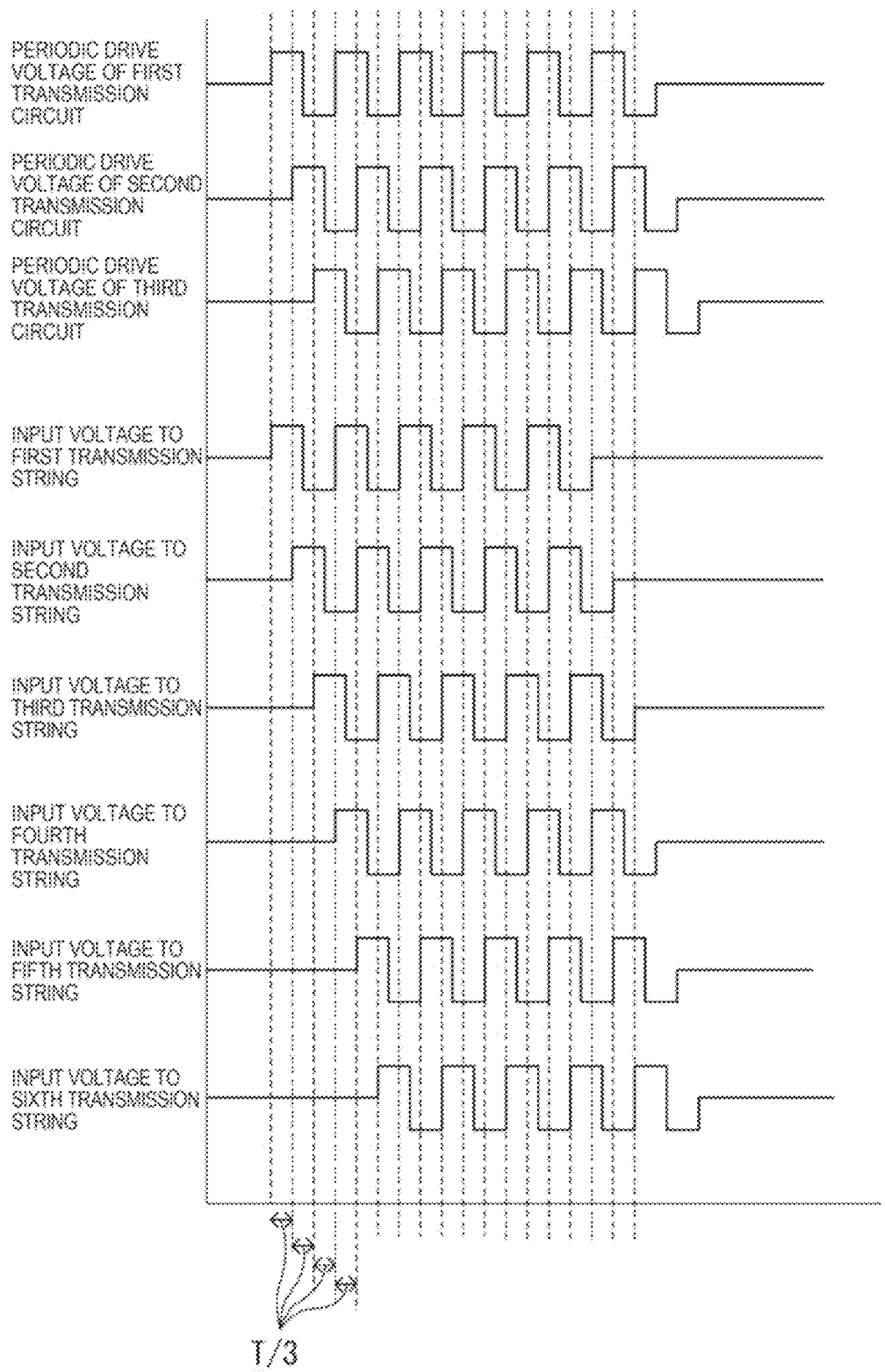
FIG. 22 is a timing chart of the ultrasonic sensor of FIG. 21.

FIG. 21 is a diagram illustrating a circuit configuration in a case where n=2, and FIG. 22 is a timing chart of input voltages (periodic drive voltages) input to the respective transmission strings 23A of the ultrasonic sensor 15 in a case where n=2 and h=1.

In the example of FIG. 21, the transmission strings 23A (transmission elements 23) arranged every two in the X direction are set as one transmission control group. That is, the transmission control group is divided into a transmission control group including the (3k−2)-th transmission string 23A, a transmission control group including the (3k−1)-th transmission string 23A, and a transmission control group including the 3k-th transmission string 23A from the −X side.

As illustrated in FIG. 22, a first transmission circuit 312C corresponding to the (3k−2)-th transmission string 23A generates a periodic drive voltage of a cycle instructed from the timing control unit 313. A second transmission circuit 312D corresponding to the (3k−1)-th transmission string 23A generates a periodic drive voltage whose phase is delayed by a one-third cycle with respect to the periodic drive voltage generated by the first transmission circuit 312C. A third transmission circuit 312E corresponding to the 3k-th transmission string 23A generates a periodic drive voltage whose phase is delayed by a one-third cycle of the periodic drive voltage generated by the second transmission circuit 312D.

The timing control unit 313 switches the switching elements 311 connected to the respective transmission strings 23A sequentially from the −X side end portions (or the +X side end portion) from a disconnection position to a connection position by delaying by a one-third of the periodic drive voltage. Thereby, as illustrated in FIG. 22, the periodic drive voltages are sequentially applied with a delay time of a one-third cycle from the first transmission string 23A at the −X side end portion toward the +X side.

In addition, FIG. 21 illustrates an example in which the periodic drive voltages obtained by delaying phases by a 1/n cycle are sequentially input from the transmission strings 23A at the −X side end portion to the respective transmission circuits, but the invention is not limited to this. For example, periodic drive voltages delayed by a h/n cycle may be input.

In the example illustrated in FIG. 21, the second transmission circuit 312D may generate a periodic drive voltage obtained by delaying a phase of the periodic drive voltage generated by the first transmission circuit 312C by two third cycle, and the third transmission circuit 312E may generate a periodic drive voltage obtained by delaying a phase of the periodic drive voltage generated by the second transmission circuit 312D by two third cycle.

The first embodiment described above exemplifies an example in which, when an element pitch at which no grating lobe is generated is referred to as dg, an interval (the transmission element pitch d) between the transmission elements 23 is set to 1<d<2 dg, but the invention is not limited to this, and the transmission element pitch d may be equal to or smaller than dg at which no grating lobe is generated.

By setting the transmission element pitch d as d≤dg, the number of the transmission elements 23 that need to be disposed in the transmission unit 15A increases, and a wiring configuration of the transmission circuit substrate 31 is complicated. However, in the first embodiment, each transmission string 23A can be delay-driven only by the first transmission circuit 312A and the second transmission circuit 312B, and in the second embodiment and the third embodiment, each transmission string 23A can be delay-driven by only one transmission circuit 312. Thus, it is possible to simplify the circuit configuration as compared with a configuration in which a dedicated transmission circuit is provided corresponding to each of the plurality of transmission elements 23 (transmission strings 23A) arranged at the transmission element pitch d of, for example, d≤dg.

In a case where the transmission element pitch d of the transmission element 23 is set to dg<d<2 dg, a transmission circuit may be provided for each transmission string 23A as a circuit configuration of the transmission unit 15A. By setting the transmission element pitch d to dg<d<2 dg, the number of transmission strings 23A is reduced as compared with a case where the transmission element pitch d is set to d≤dg, and accordingly, the required number of transmission circuits is reduced. Particularly, in addition to a plus power source and a minus power source for bipolar drive, a transistor with a high withstand voltage is required for a transmission circuit that generates a periodic drive voltage which is input to each transmission string 23A, resulting in a circuit with a large and expensive circuit scale. Thus, in the present configuration that can reduce the number of transmission circuits as compared with the configuration of the related art, it is possible to effectively reduce a cost of the ultrasonic sensor.

The first embodiment exemplifies the image scanner 10 as an example of the electronic apparatus according to the invention, but the invention is not limited to this. For example, a print device (printer) provided with a print head for printing an image on a print paper sheet transported on a transport path may adopt the ultrasonic sensor 15 according to the invention when multi-feed of the print paper sheet is detected.

The print device may use the ultrasonic sensor 15 according to the invention when the type of print paper sheet is determined. That is, the print device stores a voltage value of a received signal from the reception unit 15B and the type of print paper sheet in a storage unit storing the associated table data. A control unit (computer) provided in the print device functions as a state detecting unit according to the invention and determines the type of print paper sheet corresponding to the received signal from the reception unit 15B with reference to the table data. In this case, the print device can form an optimum image depending on the type of print paper sheet on the print paper sheet.

An object is not limited to the paper sheet P or the print paper sheet, and may be a film, a fabric, or the like as described above.

Furthermore, the ultrasonic sensor according to the invention may be applied to a flow velocity detecting device that detects a flow velocity of a fluid flowing through a pipe or the like. That is, if an ultrasonic wave is transmitted to the fluid which is the object and the ultrasonic wave passing through the fluid is received, a travel direction of the ultrasonic wave changes depending on the flow velocity of the fluid. At this time, it is possible to measure the flow velocity of the fluid by detecting a change in a voltage value of the received signal. In order to measure the flow velocity of the fluid from the voltage change of the received signal, the flow velocity detecting device needs to accurately direct a sound axis of the ultrasonic wave transmitted from a transmission unit toward the reception portion and needs to set a reference position. By using the ultrasonic sensor according to the invention, it is possible to accurately set the reference position and to improve a flow velocity measurement accuracy of a flow velocity measurement device.

Besides, a specific structure at the time of practicing the invention may be constituted by appropriately combining the respective embodiments and the modification example within a range in which the object of the invention can be attained or may be appropriately changed to other structures or the like.

The entire disclosure of Japanese Patent Application No. 2018-033608 filed Feb. 27, 2018 is expressly incorporated herein by reference.

What is claimed is:

1. An ultrasonic sensor comprising:
    a transmission unit that is disposed on a first axis which is inclined with respect to a normal line of a surface of an object sheet, the object sheet traveling along an object feed direction by first and second feed roller pairs;
    a reception unit that is provided on a side opposite to the transmission unit of the object sheet, on the first axis; and
    a transmission control unit that controls drive of the transmission unit,
    wherein the transmission unit includes a plurality of transmission elements that transmit ultrasonic waves, the ultrasonic waves are transmitted from a transmission surface of the transmission unit, and the plurality of transmission elements are arranged in a first direction that intersects the first axis in a plane including the normal line and the first axis,
    the transmission surface of the transmission unit are substantially parallel to the surface of the object sheet,
    a reception surface of the reception unit receives the ultrasonic waves, a normal line of the reception surface is substantially the same as the first axis, and the reception surface is non-parallel to the surface of the object sheet,
    wherein the transmission control unit delay-drives the plurality of transmission elements to align a direction of wave surfaces of the ultrasonic waves transmitted from the transmission unit with the first axis,
    a line along the first axis that connects a center of the transmission surface and a center of the reception surface intersects the object sheet at a crossing point,
    the normal line passing through the object sheet at the crossing point is aligned on the transmission surface and is outwardly shifted from a periphery of the reception surface, and
    the ultrasonic sensor is provided between the first feed roller pair and the second feed roller pair along the object feed direction.

2. The ultrasonic sensor according to claim 1, wherein an arrangement interval between the plurality of transmission elements is one to two times a wavelength of each of the ultrasonic waves that are output from the transmission element.

3. The ultrasonic sensor according to claim 1, further comprising:
    n+1 transmission circuits in which the plurality of transmission elements that are arranged at every n interval in the first direction are set as one transmission control group, that are provided corresponding to the transmission control groups respectively, and that generate periodic drive voltages; and
    switching elements that are provided for the plurality of transmission elements respectively, and that are capable of switching between a connection position for connecting an element of the plurality of transmission elements to the transmission circuit corresponding to the transmission control group to which the element of the plurality of transmission elements belongs and a disconnection position for disconnecting the element of the plurality of transmission elements from the transmission circuit corresponding to the transmission control group to which the element of the plurality of transmission elements belongs,
    wherein k is set to a natural number from 1 to n+1, and a k-th transmission circuit corresponding to the k-th transmission control group in the first direction generates the periodic drive voltage delayed by an integer multiple of a 1/(n+1) cycle with respect to the periodic drive voltage which is generated by the (k−1)-th transmission circuit, and
    wherein the transmission control unit sequentially switches the switching elements corresponding to the plurality of transmission elements from the disconnection position to the connection position by delaying by the 1/(n+1) cycle.

4. The ultrasonic sensor according to claim 1, further comprising:
    transmission circuits that generate periodic drive voltages; and
    switching elements that are provided for the plurality of transmission elements respectively, and that are capable of switching between a connection position for connecting an element of the plurality of transmission elements to the transmission circuit and a disconnection position for disconnecting the element of the plurality of transmission elements from the transmission circuit,
    wherein the transmission control unit delays the switching elements corresponding to the plurality of transmission elements by an integral multiple of a cycle of the periodic drive voltage to sequentially switch from the disconnection position to the connection position.

5. The ultrasonic sensor according to claim 1, further comprising:
    a transmission circuit that generates a periodic drive voltage; and
    a multiplexer that is connected to the plurality of transmission elements and the transmission circuit and capable of switching the plurality of transmission elements of an output destination of the periodic drive voltage which is input from the transmission circuit,
    wherein the transmission control unit causes the multiplexer to sequentially switch the plurality of transmission elements in the first direction outputting the periodic drive voltage by delaying a cycle of the periodic drive voltage by an integer multiple.

6. The ultrasonic sensor according to claim 3, wherein the transmission control unit changes a cycle of the periodic drive voltage that is generated by the transmission circuit.

7. An electronic apparatus comprising:
    the ultrasonic sensor according to claim 1; and a state detection unit that detects a state of the object sheet in accordance with an output from the reception unit of the ultrasonic sensor.

8. An electronic apparatus comprising:
the ultrasonic sensor according to claim 2; and
a state detection unit that detects a state of the object sheet in accordance with an output from the reception unit of the ultrasonic sensor.

9. An electronic apparatus comprising:
the ultrasonic sensor according to claim 3; and
a state detection unit that detects a state of the object sheet in accordance with an output from the reception unit of the ultrasonic sensor.

10. An electronic apparatus comprising:
the ultrasonic sensor according to claim 4; and
a state detection unit that detects a state of the object sheet in accordance with an output from the reception unit of the ultrasonic sensor.

11. An electronic apparatus comprising:
the ultrasonic sensor according to claim 5; and
a state detection unit that detects a state of the object sheet in accordance with an output from the reception unit of the ultrasonic sensor.

12. An electronic apparatus comprising:
the ultrasonic sensor according to claim 6; and
a state detection unit that detects a state of the object sheet in accordance with an output from the reception unit of the ultrasonic sensor.

13. A method of driving an ultrasonic sensor which includes a transmission unit that is disposed on a first axis which is inclined with respect to a normal line of a surface of an object sheet, the object sheet traveling along an object feed direction by first and second feed roller pairs, and a reception unit that is provided on a side opposite to the transmission unit of the object sheet, on the first axis, and in which the transmission unit includes a plurality of transmission elements that transmit ultrasonic waves, the ultrasonic waves are transmitted from a transmission surface of the transmission unit, the plurality of transmission elements are arranged in a first direction that intersects the first axis in a plane including the normal line and the first axis, the transmission surface of the transmission unit are substantially parallel to the surface of the object sheet, a reception surface of the reception unit receives the ultrasonic waves, a normal line of the reception surface is substantially the same as the first axis, and the reception surface is non-parallel to the surface of the object sheet, the method comprising:

detecting a voltage of a received signal that is output when the ultrasonic waves are received by the reception unit by setting m as a natural number greater than or equal to 1, and by delaying a periodic drive voltage of a predetermined cycle by an integer multiple of a 1/m cycle of the periodic drive voltage to input the plurality of transmission elements so that a direction of wave surfaces of the ultrasonic waves transmitted from the transmission unit is aligned with the first axis;

setting a cycle of the periodic drive voltage, based on the voltage of the received signal that is detected in the detecting the voltage; and detecting a state of the object sheet, based on the voltage of the received signal that is received by the reception unit, by delaying the periodic drive voltages of the cycle which is set in the setting of the cycle by the integer multiple of the 1/m cycle of the periodic drive voltage to input the plurality of transmission elements and to drive the plurality of transmission elements, wherein in the detecting the voltage, the voltage of the received signal for each cycle is detected by changing the cycle of the periodic drive voltage, wherein in the setting the cycle, a cycle is selected when the voltage of the received signal reaches a maximum value and the cycle is set as a cycle that is used in the detecting the state, a line along the first axis that connects a center of the transmission surface and a center of the reception surface intersects the object sheet at a crossing point, the normal line passing through the object sheet at the crossing point is aligned on the transmission surface and is outwardly shifted from a periphery of the reception surface, and the ultrasonic sensor is provided between the first feed roller pair and the second feed roller pair along the object feed direction.

\* \* \* \* \*